United States Patent
Tsai

(10) Patent No.: US 12,506,569 B2
(45) Date of Patent: Dec. 23, 2025

(54) PHASE TRACKING IN SYSTEMS AIDED BY RATE CONVERTING AND FREQUENCY TRANSLATION DEVISES

(71) Applicant: Mediatek Inc., Hsinchu (TW)

(72) Inventor: Lung-Sheng Tsai, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 202 days.

(21) Appl. No.: 18/205,665

(22) Filed: Jun. 5, 2023

(65) Prior Publication Data
US 2024/0007239 A1  Jan. 4, 2024

Related U.S. Application Data

(60) Provisional application No. 63/367,633, filed on Jul. 4, 2022.

(51) Int. Cl.
*H04L 5/00* (2006.01)
*H04W 56/00* (2009.01)
*H04W 88/04* (2009.01)

(52) U.S. Cl.
CPC .......... *H04L 5/0023* (2013.01); *H04L 5/0051* (2013.01); *H04W 56/0035* (2013.01); *H04W 88/04* (2013.01)

(58) Field of Classification Search
CPC ......... H04W 56/0035; H04W 56/0055; H04W 56/004; H04W 56/001; H04W 56/0005; H04W 88/04; H04W 88/06; H04L 5/0023; H04L 5/0048; H04L 5/0051; H04L 5/0053; H04L 5/0016; H04L 5/0014
See application file for complete search history.

(56) References Cited

U.S. PATENT DOCUMENTS

| 2018/0287759 A1* | 10/2018 | Kundargi | .......... H04W 56/0035 |
| 2021/0176099 A1* | 6/2021 | Pajukoski | ............... H04L 25/03 |
| 2024/0007239 A1* | 1/2024 | Tsai | ...................... H04L 5/0051 |

FOREIGN PATENT DOCUMENTS

| CN | 110771078 A | * | 2/2020 | ........... H04B 7/0626 |
| WO | WO-2022010014 A1 | * | 1/2022 | ........ H04W 74/0833 |

\* cited by examiner

*Primary Examiner* — Phong La
(74) *Attorney, Agent, or Firm* — Troutman Pepper Locke LLP; Tim Tingkang Xia, Esq.

(57) ABSTRACT

A UE receives second baseband signals carried on a second carrier frequency ($f_2$) transmitted by at least one repeater. The second baseband signals carry data signals transmitted from a base station and are derived from first baseband signals carried on a first carrier frequency ($f_1$) transmitted from the base station. The UE estimates CPEs in a first set of OFDM symbols based on PT-RSs included in the received second baseband signals. The PT-RSs are transmitted by the base station on the first carrier frequency ($f_1$) and forwarded to the UE on the second carrier frequency ($f_2$) through the at least one repeater. The UE detects the data signal based on the received second baseband signals and the estimated CPEs in the first set of OFDM symbols.

20 Claims, 18 Drawing Sheets

PHASE TRACKING IN SYSTEMS AIDED BY RATE CONVERTING AND FREQUENCY TRANSLATION DEVISES

This application claims the benefits of U.S. Provisional Application Ser. No. 63/367,633, entitled "PHASE TRACKING IN DISTRIBUTED MIMO SYSTEMS" and filed on Jul. 4, 2022. The content of the application above is expressly incorporated by reference herein in its entirety.

BACKGROUND

Field

The present disclosure relates generally to communication systems, and more particularly, to techniques of forming distributed MIMO receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives second baseband signals carried on a second carrier frequency ($f_2$) transmitted by at least one repeater. The second baseband signals carry data signals transmitted from a base station and are derived from first baseband signals carried on a first carrier frequency ($f_1$) transmitted from the base station. The UE estimates common phase errors (CPEs) in a first set of Orthogonal Frequency-Division Multiplexing (OFDM) symbols based on Phase Tracking Reference Signals (PT-RSs) included in the received second baseband signals. The PT-RSs are transmitted by the base station on the first carrier frequency ($f_1$) and forwarded to the UE on the second carrier frequency ($f_2$) through the at least one repeater. The UE detects the data signal based on the received second baseband signals and the estimated CPEs in the first set of OFDM symbols.

In another aspect of the disclosure, a method, a computer-readable medium, and an apparatus are provided. The apparatus may be a base station. The base station receives first baseband signals carried on a first carrier frequency ($f_1$) transmitted by at least one repeater. The first baseband signals are derived from second baseband signals carried on a second carrier frequency ($f_2$) transmitted from a UE. The base station estimates CPEs in a first set of OFDM symbols for a respective link between the UE and the base station through each repeater of the at least one repeater. This estimation is based on PT-RSs associated with that repeater included in the received first baseband signals. The PT-RSs are transmitted by the UE on the second carrier frequency ($f_2$) and forwarded to the base station on the first carrier frequency ($f_1$) through that repeater. The base station compensates the first baseband signals received from each repeater based on the estimated CPEs associated with a respective link between the UE and the base station through that repeater.

In yet another aspect of the disclosure, a method, a computer-readable medium, and an apparatus are provided. The apparatus may be a wireless device. The wireless device receives second baseband signals transmitted from a user equipment (UE) on a second carrier frequency $f_2$. The wireless device estimates CPEs in a first set of OFDM symbols based on PT-RSs included in the received second baseband signals. The wireless device compensates the received second baseband signals for the estimated CPEs in the first set of OFDM symbols. The wireless device maps the compensated second baseband signals to first baseband signals to be transmitted on a first carrier frequency $f_1$ to a base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
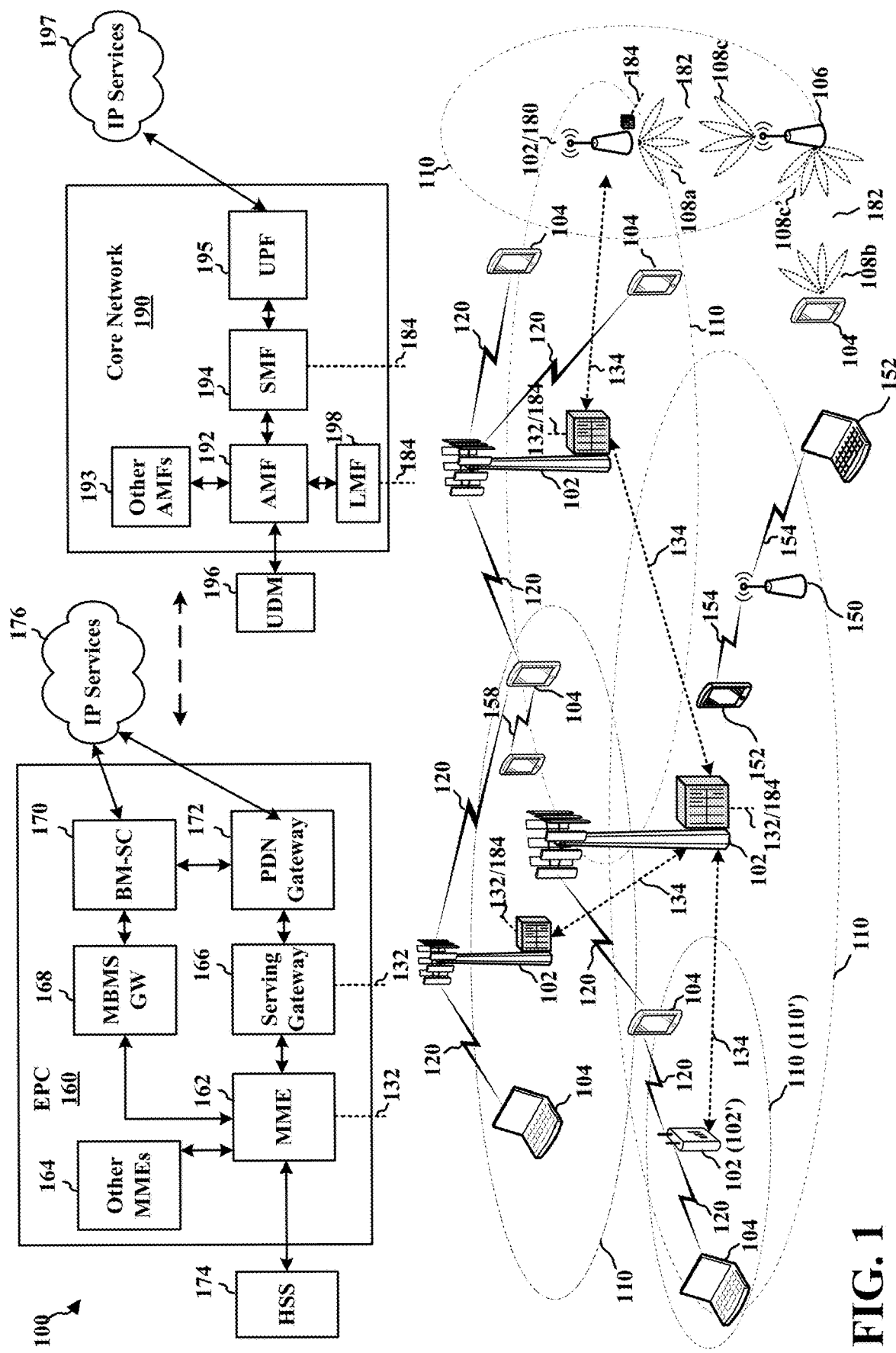
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
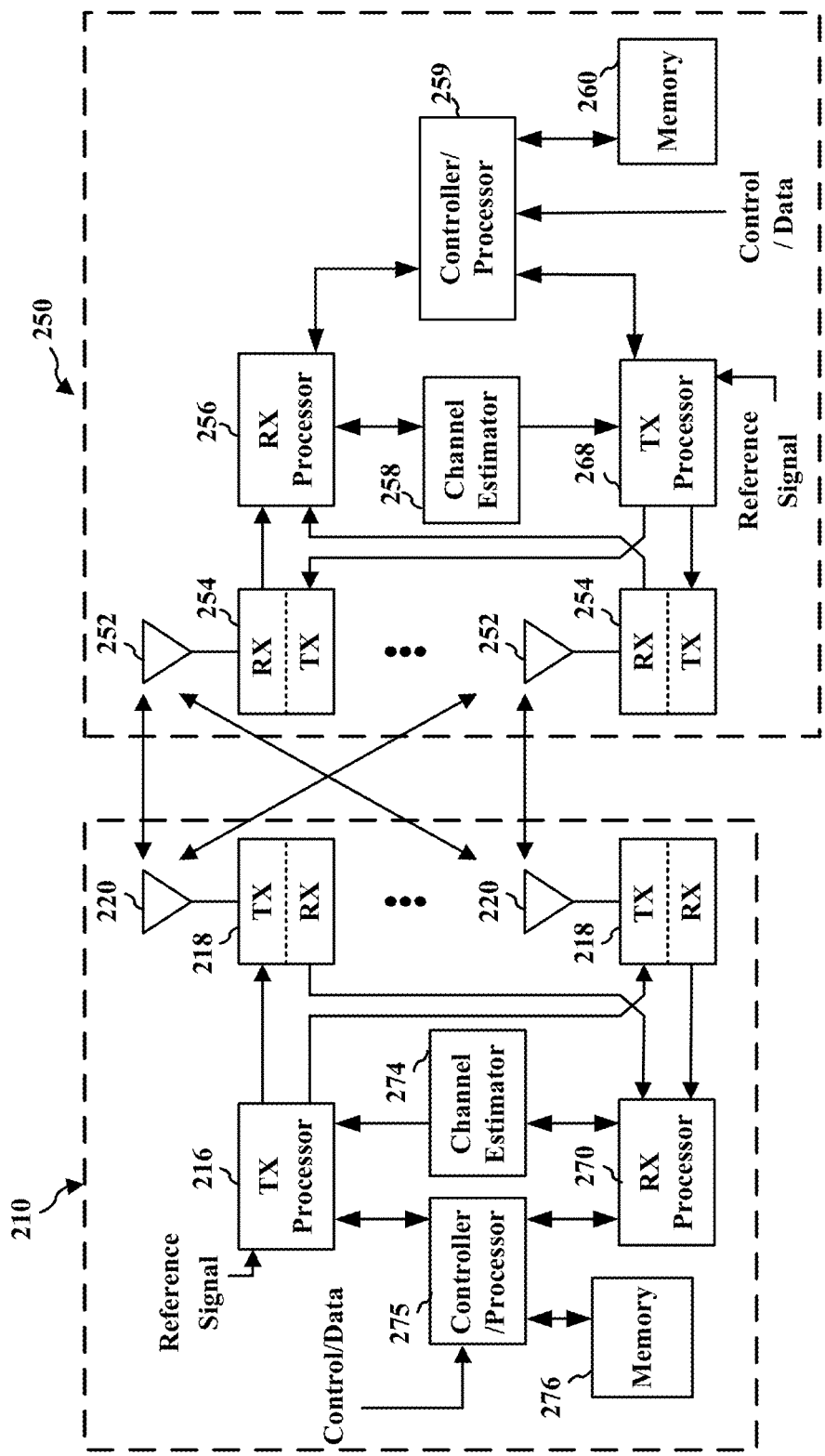
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
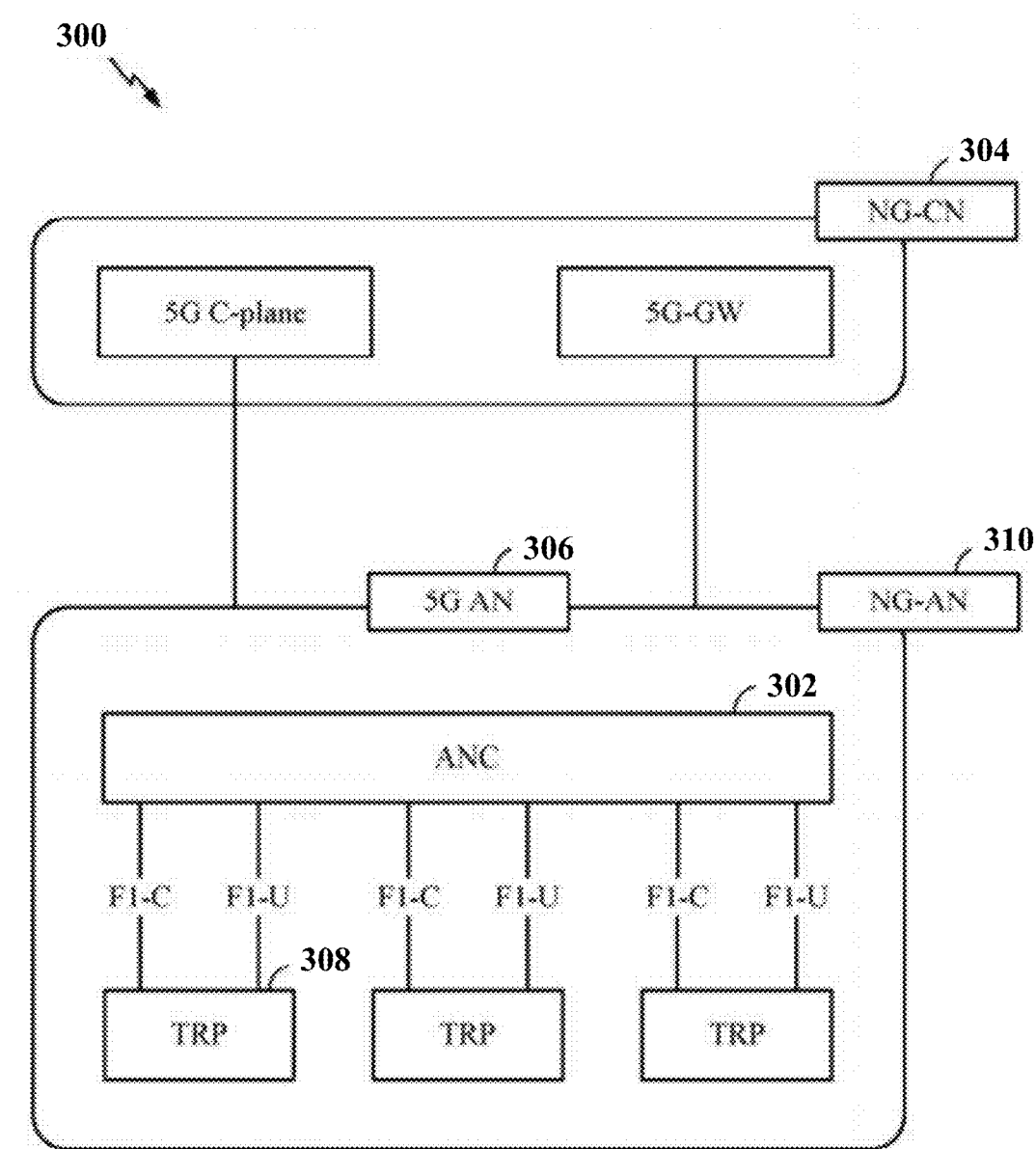
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "ccell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
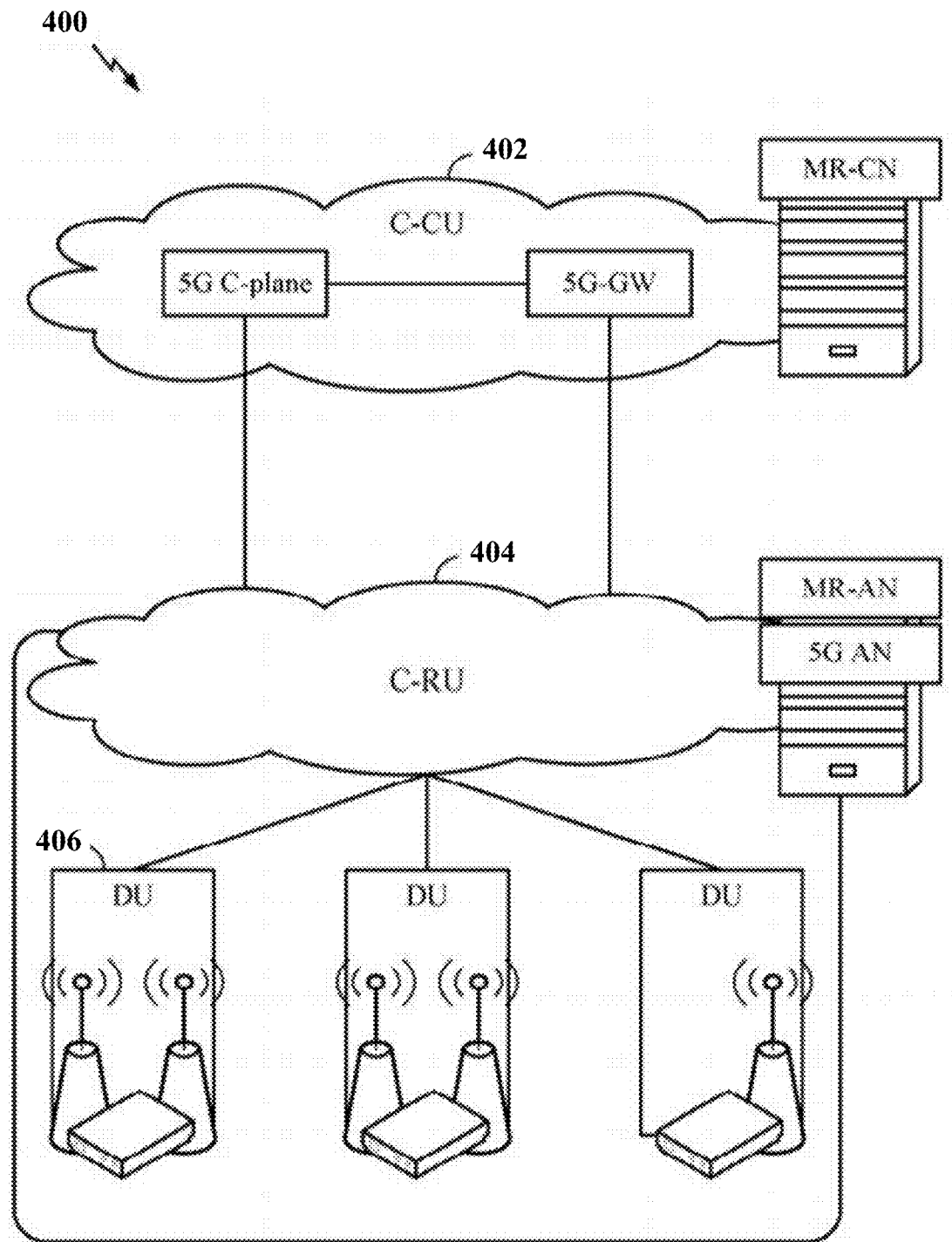
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
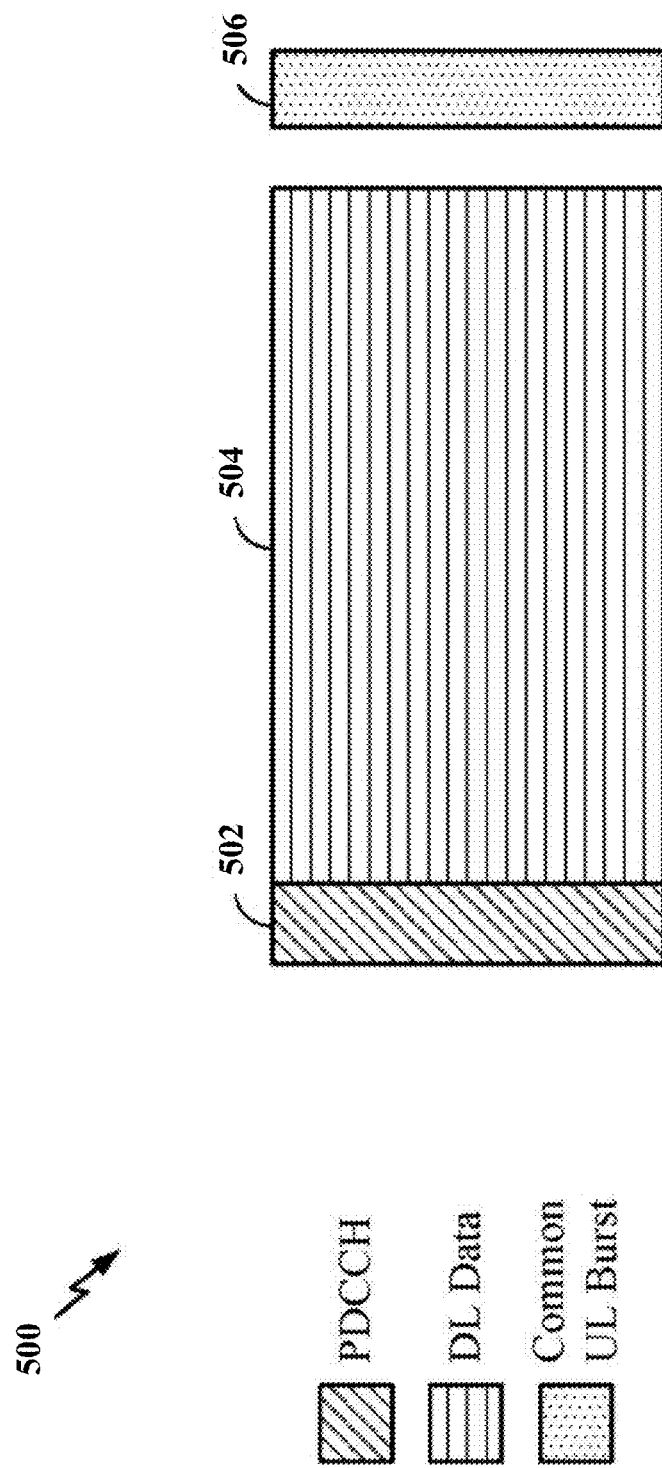
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
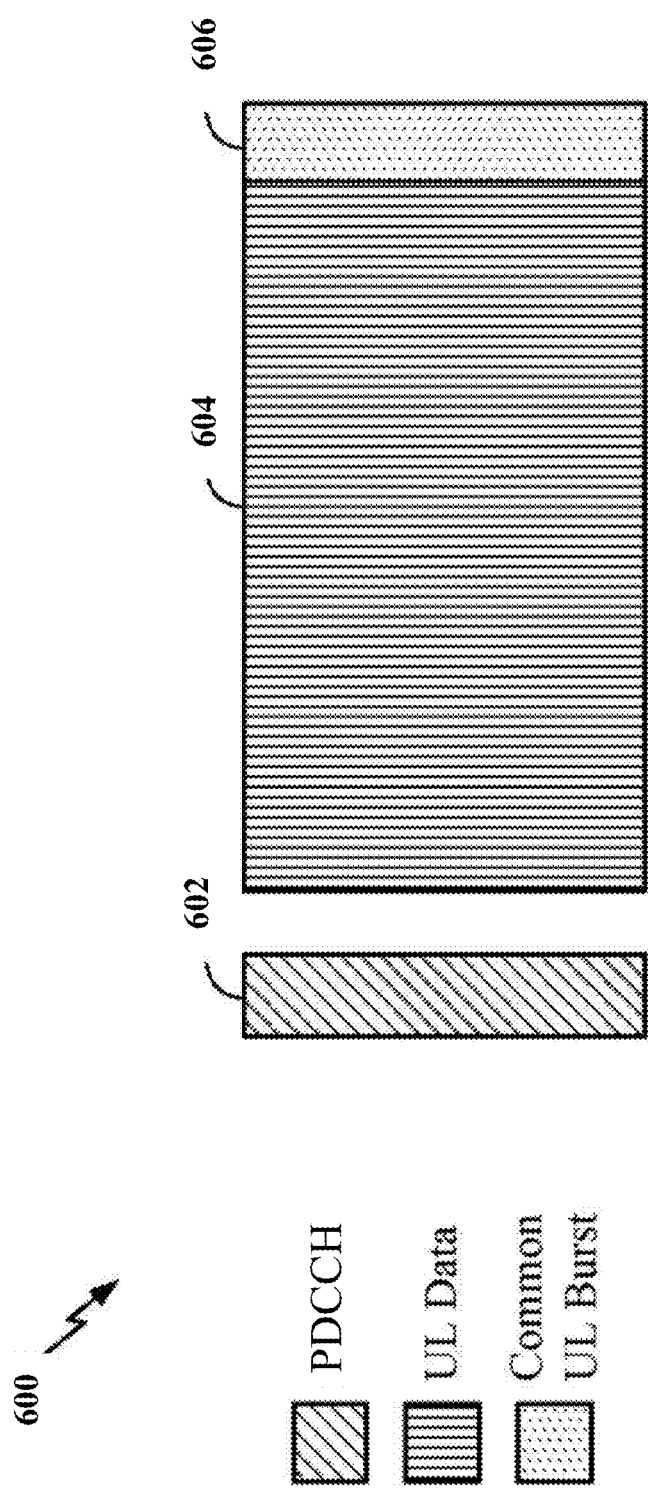
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UET) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
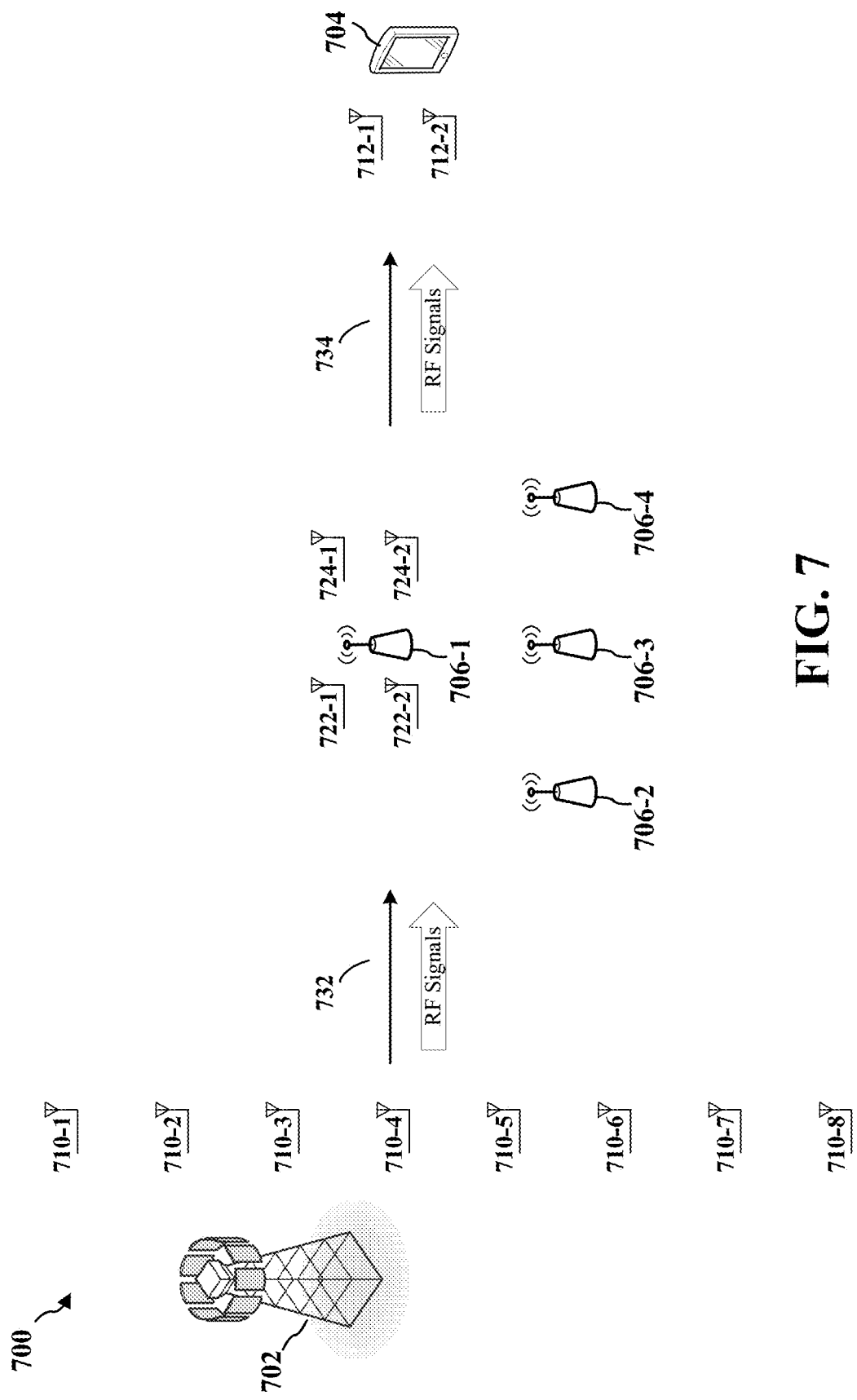
FIG. 7 is a diagram illustrating downlink MIMO transmission from a base station to a UE via one or more repeaters.

FIG. 7 is a diagram 700 illustrating downlink MIMO transmission from a base station to a UE via one or more repeaters. In this example, a base station 702 has 8 antennas 710-1, 710-2, . . . 710-8 and a UE 704 has 2 reception antennas 712-1, 712-2. Further, repeaters 706-1 . . . 706-K are placed between the base station 702 and the UE 704. In this example, K is 4. Each of the repeaters 706-1 . . . 706-K has two reception antennas 722-1, 722-2 and two transmission antennas 724-1, 724-2. In certain configurations, the same antenna may function as a reception antenna and a transmission antenna. The 2 reception antennas 722-1, 722-2 of the repeater 706 receive the RF signals transmitted at the antennas 710-1, 710-2, . . . 710-8 on the frequency band $f_i$ through a channel 732. The repeater 706 transmits RF signals on the frequency band $f_2$ at the 2 transmission antennas 724-1, 724-2. The 2 reception antennas 714-1, 714-2 of the UE 704 receive, on the frequency band $f_2$, the RF signals transmitted at the repeater 806 through the channel 734.

Figure 8:
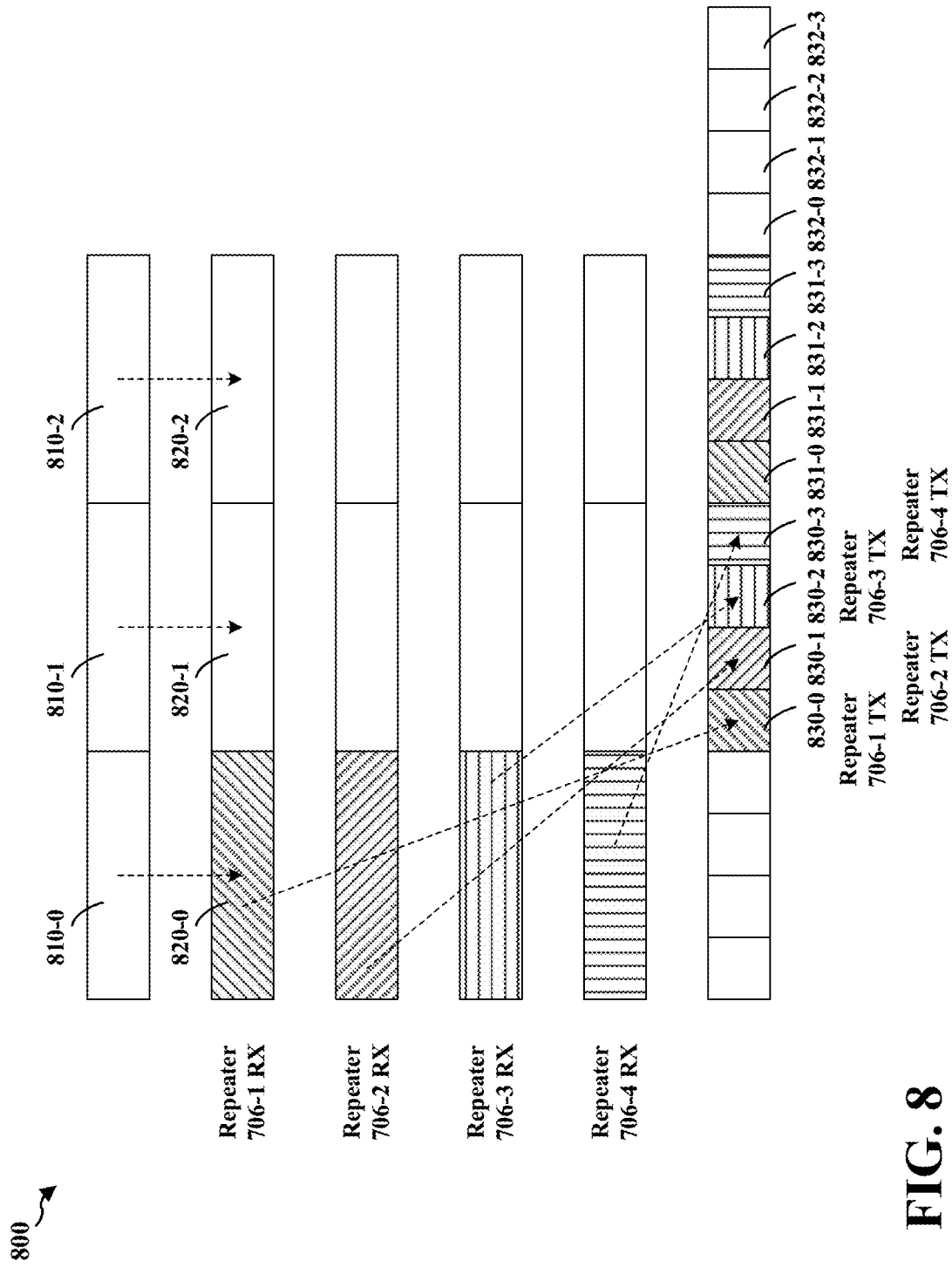
FIG. 8 is a diagram illustrating downlink transmission timing from a base station to a UE via one or more repeaters.

FIG. 8 is a diagram 800 illustrating downlink transmission timing from a base station to a UE via one or more repeaters. The base station 702 transmits, through the antennas 710-1, 710-2, . . . 710-8, RF signals on a first carrier frequency in slots 810-0, 810-1, 810-2, etc. The repeaters 706-1 . . . 706-K receives the RF signals of the first carrier frequency in the slots 820-0, 820-1, 820-2, etc. As described infra, the slots 810-0, 810-1, 810-2, etc. and 820-0, 820-1, 820-2, etc. are corresponding to a first subcarrier spacing ($SCS_1$) and each occupies one $TTI_1$ interval. The repeaters 706-1 . . . 706-K transform a first set of baseband signals carried on the RF signals of the first carrier frequency to obtain a second set of baseband signals, and transmit the second set of baseband signals over RF signals of a second carrier frequency in slots 830-0, . . . , 830-$q$, slots 831-0, . . . , 831-$q$, and slots 832-0, . . . , 832-$q$, etc. As described infra, the slots 830-0, . . . , 830-$q$ etc. are corresponding to a second subcarrier spacing ($SCS_2$, e.g., 120 kHz) and each occupy one $TTI_2$ interval. In this example, q is 3.

In this example, the repeaters 706-1 . . . 706-K receives RF signals in the slot 820-0. The repeater 706-1 transmits its RF signals in slot 830-0; the repeater 706-2 transmits its RF signals in slot 830-1; the repeater 706-3 transmits its RF signals in slot 830-2; and the repeater 706-4 transmits its RF signals in slot 830-3.

Phase tracking is a critical aspect in FR2 systems, as it helps address the phase noise issue that arises due to the unique RF characteristics of mmWave frequencies. In these systems, phase noise can cause a common phase error (CPE) between symbols, leading to degradation in system performance. To tackle this issue, NR has introduced the Phase Tracking Reference Signal (PT-RS), which allows tracking and estimation of phase rotation between symbols along the time domain.

PTRS is particularly important in systems where signals are forwarded between two different frequency ranges, such as FR1 and FR2. In FR1 (e.g., $f_1$), the base station 702 does not need to send PTRS, as the phase noise issue is not as severe. However, when the signal is forwarded to FR2 (e.g., $f_2$), phase noise becomes a significant problem, and PTRS is required to estimate and compensate for the CPE.

In this example, the base station 702 is capable of sending PT-RS in FR1, even though it is not needed in that frequency range. The signals from the base station 702 contain PT-RSs when they are forwarded to the UE 704 in FR2 through the repeaters 706-1 to 706-4, allowing the UE 704 to estimate the CPE caused by the forwarding process. Additionally, the UE 704 are aware of this requirement so that it can accurately estimate the phase errors.

Figure 9:
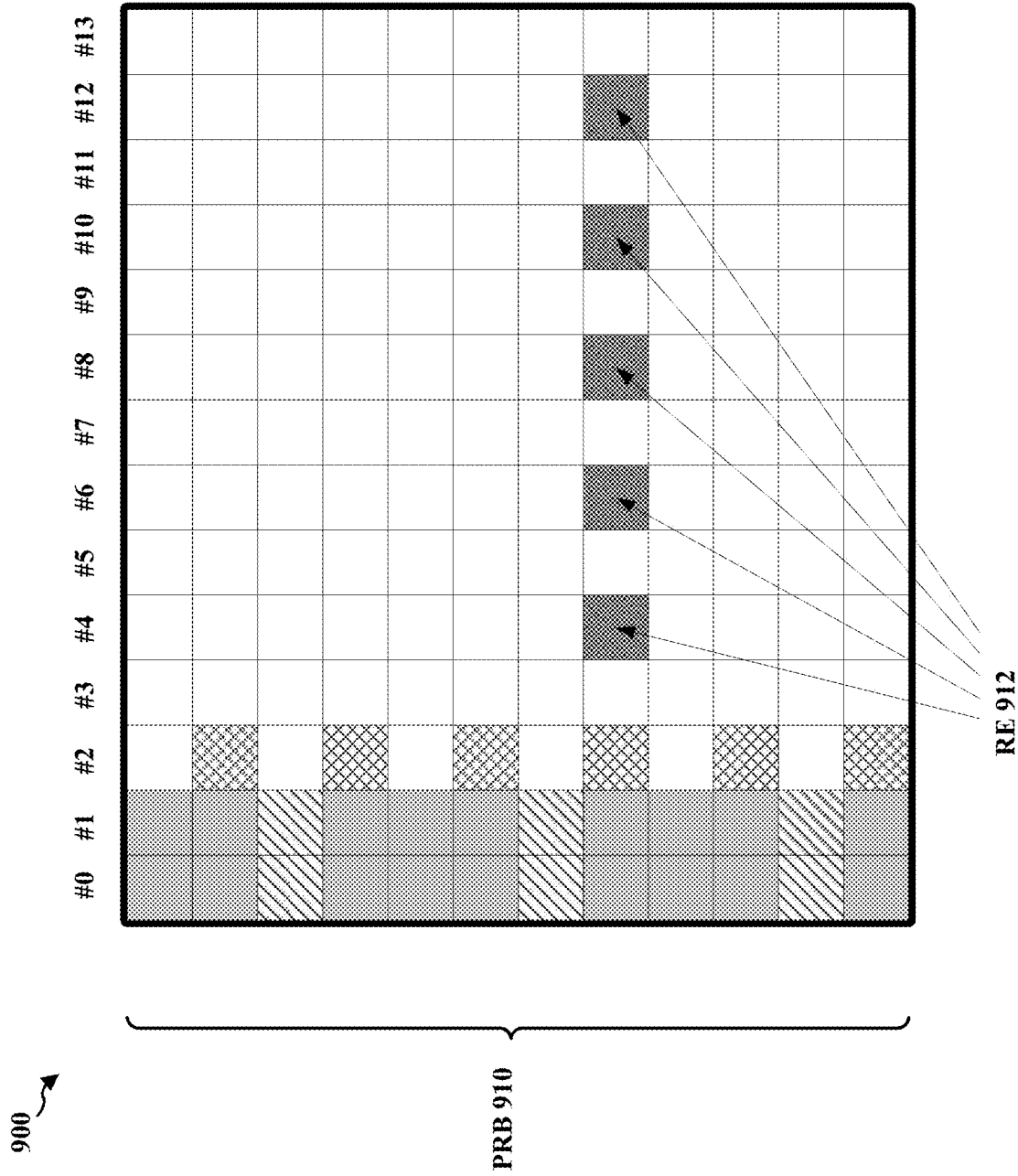
FIG. 9 is a diagram illustrating a physical resource block (PRB) transmitted by a base station in a slot.

FIG. 9 is a diagram 900 illustrating a physical resource block (PRB) 910 transmitted by the base station 702 in a slot. The slot contains PDCCH 942, PDCCH DM-RS 944, PDSCH 952, PDSCH DM-RS 954 and PDSCH PT-RS 956. In this example, the REs 912 carry PDSCH PT-RSs 956, where are transmitted in every two symbols in the time domain.

A second time-frequency resources (e.g., $f_2$ in FR2) are allocated for the local communications among the UE 704 and the repeaters 706-1 . . . 706-K. The PT-RSs 956 are included in the RF signals from base station 702 to help the UE 704 compensate the CPE occurring in the transmissions on $f_2$. The PT-RSs 956 from the base station 702 may be all from one port. When the UE 704 starts the local communications with the repeaters 706-1 . . . 706-K and obtains baseband signals from the RF signals, the UE 704 can determine and compensate the CPE with the help of the PT-RSs 956.

Denote the channel response between a transmitter (e.g., the base station 702) and a receiver (e.g., the UE 704) on a subcarrier l in an OFDM symbol m is $h_{l,m}$. The estimated channel based on measurements of the DM-RSs at the receiver in an OFDM symbol d containing DM-RSs can be expressed as $$\hat{H}_{l,d}^{DMRS} = h_{l,d} e^{j\phi_d} + n_{l,d},$$

where $h_{l,d}$ is the true channel frequency response for the subcarrier l and the symbol d, $n_{l,d}$ is received noise, and $\phi_d$ is the phase rotation in the symbol d produced by the CPE effect.

Similarly, the estimated channel based on PT-RS measurements on the subcarrier l in an OFDM symbol q containing PT-RSs at the receiver can be expressed as $$\hat{H}_{l,q}^{PTRS} = H_{l,q} e^{j\phi_q} + n_{l,q},$$

where $\phi_q$ is the phase rotation in the symbol q produced by the CPE effect.

In this example, the symbol 2 contains DM-RSs and, thus, d=2. The estimation of CPE in an OFDM symbol q, in which there is PT-RS, is given by $$\hat{\phi}_q = \frac{1}{N_{PTRS}} \sum_{l \in P} \arg\left(\frac{\hat{H}_{l,q}^{PTRS}}{\hat{H}_{l,2}^{DMRS}}\right).$$

where $N_{PTRS}$ is the number of subcarriers scheduled with PT-RSs, P is the set of the indices of the subcarriers scheduled with PT-RSs and arg(·) is the argument function, which returns the phase angle of a complex number.

The equation calculates the average phase difference between the estimated channel based on PT-RS measurements and the estimated channel based on DM-RS measurements for all subcarriers scheduled with PT-RSs. By doing this, phase rotations caused by the CPE in the received signals may be estimated.

For those OFDM symbols containing no PT-RS, the corresponding phase rotations produced by the CPE can be estimated via interpolation from the estimated phase rotation $\hat{\phi}$ in symbols containing PT-RSs.

Accordingly, the CPE in an OFDM symbol may be compensated based on the phase rotation to improve the system performance. For example, the CPE can be compensated by multiplied by a corresponding factor $e^{-j\hat{\phi}}$.

As such, using the above equation, the CPE in an OFDM symbol q containing PT-RSs may be estimated. In this example, symbol 4, symbol 6, symbol 8, symbol 10 and symbol 12 contain PT-RSs; CPEs in those symbols may be estimated by using the equation. CPEs in other symbols (e.g., symbol 3, symbol 5, symbol 7, symbol 9, symbol 11 and symbol 13) may be interpolated based on those estimations.

Further, the base station 702 sends to the UE 704 the PT-RS configuration. Based on the PT-RS configuration, the UE 704 can determine the time/frequency locations and values of the PT-RSs 956. The base station 702 may send the PT-RSs 956 from one port on $f_1$. After receiving the PT-RSs 956 on $f_1$, the repeaters 706-1 . . . 706-K forwards the PT-RSs 956 to the UE 704 a TDM manner. That is, each repeater transmits the PT-RSs 956 in a different $TTI_2$ interval (e.g., one of slots 830-0, . . . , 830-q). As such, even if PT-RSs from the same port are used on all repeater-to-UE links, the UE 704 receives PT-RSs 956 transmitted from at most one repeater in one $TTI_2$ interval. Thus, the UE 704 can estimate/compensate CPE based on the received PT-RSs 956 from a given repeater in a corresponding $TTI_2$ interval, without receiving any interference from the rest of repeaters.

Figure 10:
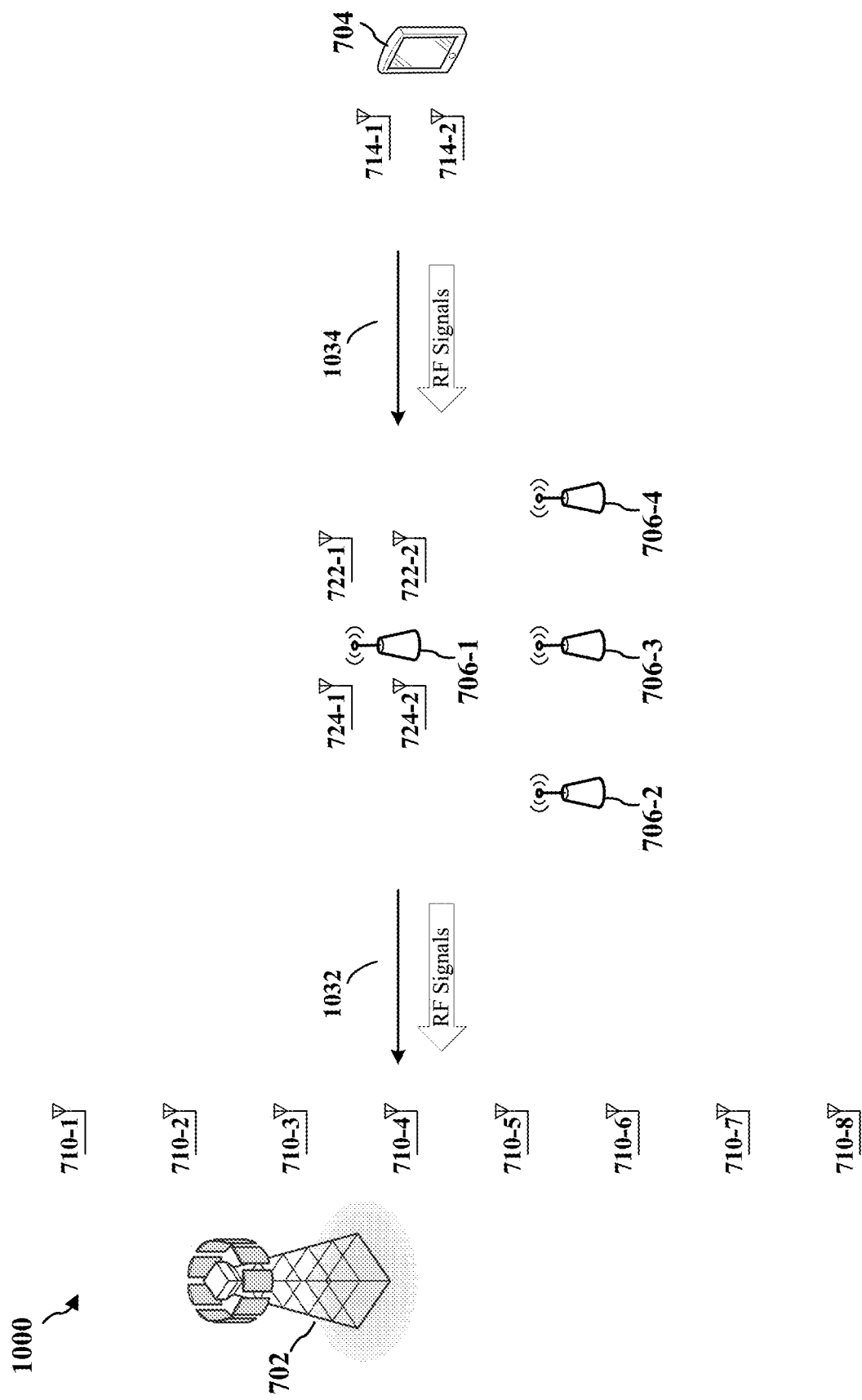
FIG. 10 is a diagram illustrating uplink MIMO transmission from a UE to a base station via one or more repeaters.

FIG. 10 is a diagram 1000 illustrating uplink MIMO transmission from a UE to a base station via one or more repeaters. In this example, the UE 704 has 2 transmission antennas 714-1, 714-2 and the base station 702 has 8 antennas 710-1, 710-2, . . . 710-8. Further, repeaters 706-1 . . . 706-K are placed between the UE 704 and the base station 702. In this example, K is 4. Each of the repeaters 706-1 . . . 706-K has two reception antennas 722-1, 722-2 and two transmission antennas 724-1, 724-2. In certain configurations, the same antenna may function as a reception antenna and a transmission antenna. For example, the 2 reception antennas 722-1, 722-2 of the repeater 706-1 receive the RF signals transmitted at the transmission antennas 714-1, 714-2 of the UE 704 on the frequency band $f_2$ through a channel 1034. The repeater 706-1 transmits RF signals on the frequency band $f_i$ at the 2 transmission antennas 724-1, 724-2. The antennas 710-1, 710-2, . . . 710-8 receive of the base station 702, on the frequency band $f_1$, the RF signals transmitted at the repeater 706-1 through a channel 1032.

Figure 11:
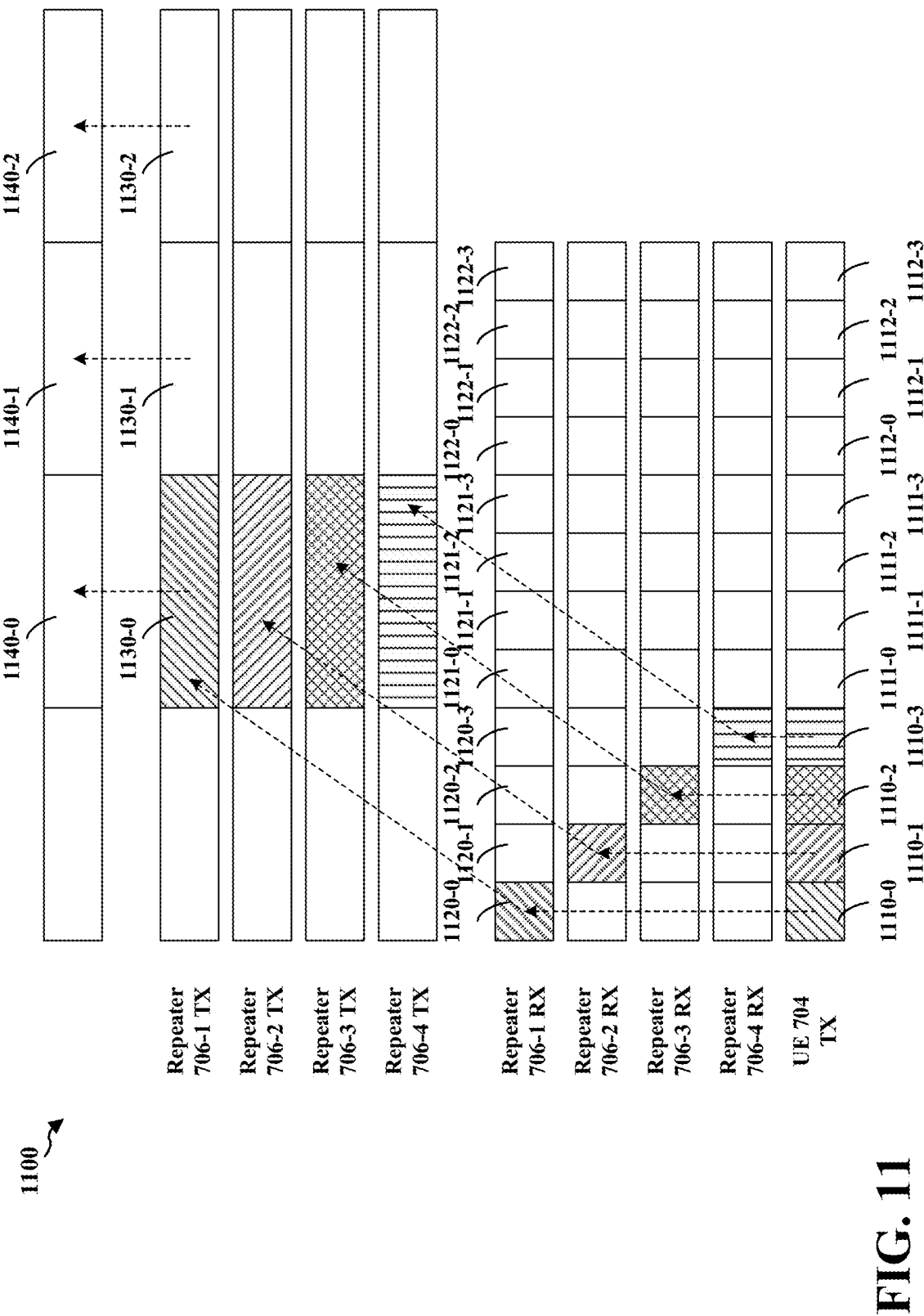
FIG. 11 is a diagram illustrating uplink transmission timing from a UE to a base station via one or more repeaters.

FIG. 11 is a diagram 1100 illustrating uplink transmission timing from a UE to a base station via one or more repeaters. The UE 704 transmits signals on $f_2$ in slots 1110-0, 1110-1, . . . , 1110-q, slots 1111-0, 1111-1, . . . , 1111-q, and slots 1112-0, 1112-1, . . . , 1112-q, etc. As described infra, the slots 1110-0, . . . , 1110-q, etc. are corresponding to the second subcarrier spacing ($SCS_2$, e.g., 120 kHz). In this example, q is 3. The repeaters 706-1 . . . 706-K forwards the signals on $f_1$ in slots 1130-0, 1130-1, 1130-2, etc.

Figure 12:
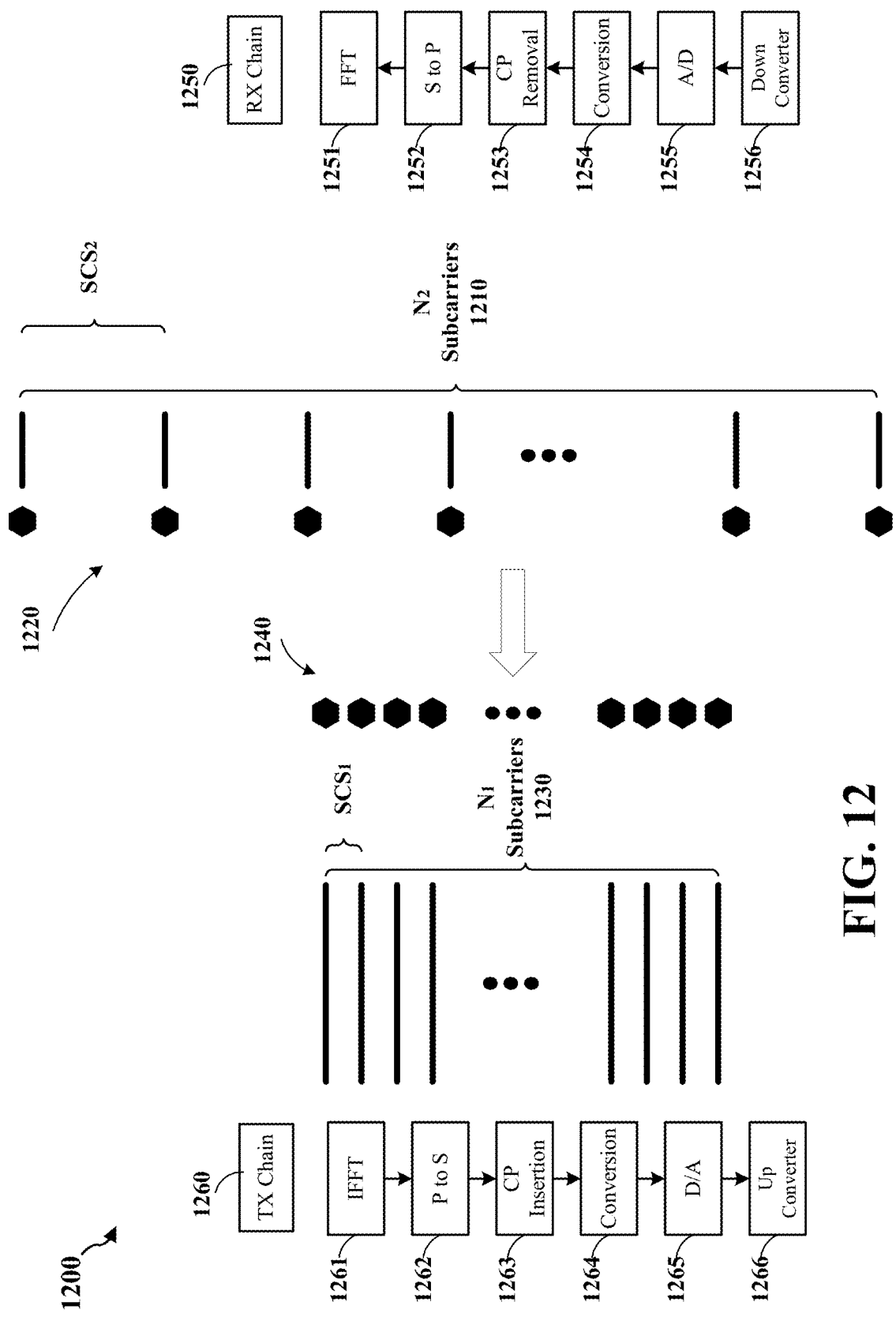
FIG. 12 is a diagram illustrating signal transformation at a repeater.

FIG. 12 is a diagram 1200 illustrating signal transformation at a repeater. Each of the repeaters 706-1 . . . 706-K has, in the uplink direction, reception antennas 724-1, 724-2. Each reception antenna uses a respective reception chain 1250 to process RF signals received through that reception antenna. Using the reception antenna 722-1 of the repeater 706-1 as an example, the FFT component 1251 of the reception antenna 724-1 has a size $N_2$. The filtered digital samples from the conversion component 1254 are passed through a down-sampling block, when necessary, to convert the data rate of the digital sample stream to match the FFT size $N_1$. Accordingly, the positions of the OFDM symbols can be determined in the down converted digital samples. Once digital samples within an OFDM symbol are found, the CP removal component 1253 removes the cyclic prefix (CP) used to prevent inter-symbol interference (ISI). The serial to parallel component 1252 groups $N_2$ data samples as an input vector for the FFT component 1251. The FFT component 1251 outputs $N_2$ modulation symbols $\tilde{g}_{k,1}$ 1220, derived from the RF signals received at the reception antenna 724-1 of the repeater 706-1. Further, the $N_2$ modulation symbols $\tilde{g}_{k,1}$ 1220 are carried on $N_2$ subcarriers 1210 with a $SCS_2$. $N_2$ modulation symbols received at the i-th antenna of the repeater 706-1 are denoted as $\tilde{g}_{k,i}$. k is the group index of the modulation symbols carried on the k-th OFDM symbol, and i is the index of the antenna port.

Further, each of the repeaters 706-1 . . . 706-K has, in the uplink direction, transmission antennas 722-1, 722-2 and uses a respective transmission chain 1260 to generate RF signals to be transmitted through each transmission antenna. Further, each transmission chain 1260 corresponds to a respective reception chain 1250. As described infra, modulation symbols received through a reception antenna of the repeater are retransmitted through a corresponding transmission antenna.

The transmission chain 1260 uses $N_1$ subcarriers 1230 having a $SCS_1$. The IFFT component 1261 uses $N_1$ points and has $N_1$ inputs/outputs. The repeater 706-1 is configured with a predetermined rule that maps the $N_2$ outputs of the FFT component 1251 to the $N_1$ inputs of the IFFT component 1261.

More specifically, the repeater 706-1 applies the k-th group of $N_1$ modulation symbols $m_{k,1}$ 1240 to the $N_1$ subcarriers 1230 to obtain a corresponding OFDM symbol. The $N_1$ subcarriers 1230 carrying the $N_1$ modulation symbols $m_{k,1}$ 1240 are sent to the IFFT component 1261 with $N_1$ inputs. The $N_1$ digital samples output from the IFFT component 1261 are treated as a time sequence and sent to the parallel to serial component 1262 to form a time domain signal. The CP insertion component 1263 receives the time domain signal and adds a cyclic prefix, resulting a time domain signal spanning an OFDM symbol B, which corresponds to $SCS_2$. The resulting time domain signal is in digital form, and is processed through a conversion component 1264 that includes a rate converter and/or filter(s) to achieve a desired sample rate. The converted time domain signal in digital form is sent to the digital-to-analog converter 1265, which accordingly generates an analog time domain signal. Subsequently, the up converter 1266 receives the analog time domain signal and mixes the analog time domain signal with the first carrier frequency ($f_1$) to generate a RF signal. The RF signal is transmitted through the transmission antenna 722-1 of the repeater 706-1. In particular, the first carrier frequency of the RF signals transmitted from the repeaters 706-1 . . . 706-K may be in FR1.

Figure 13:
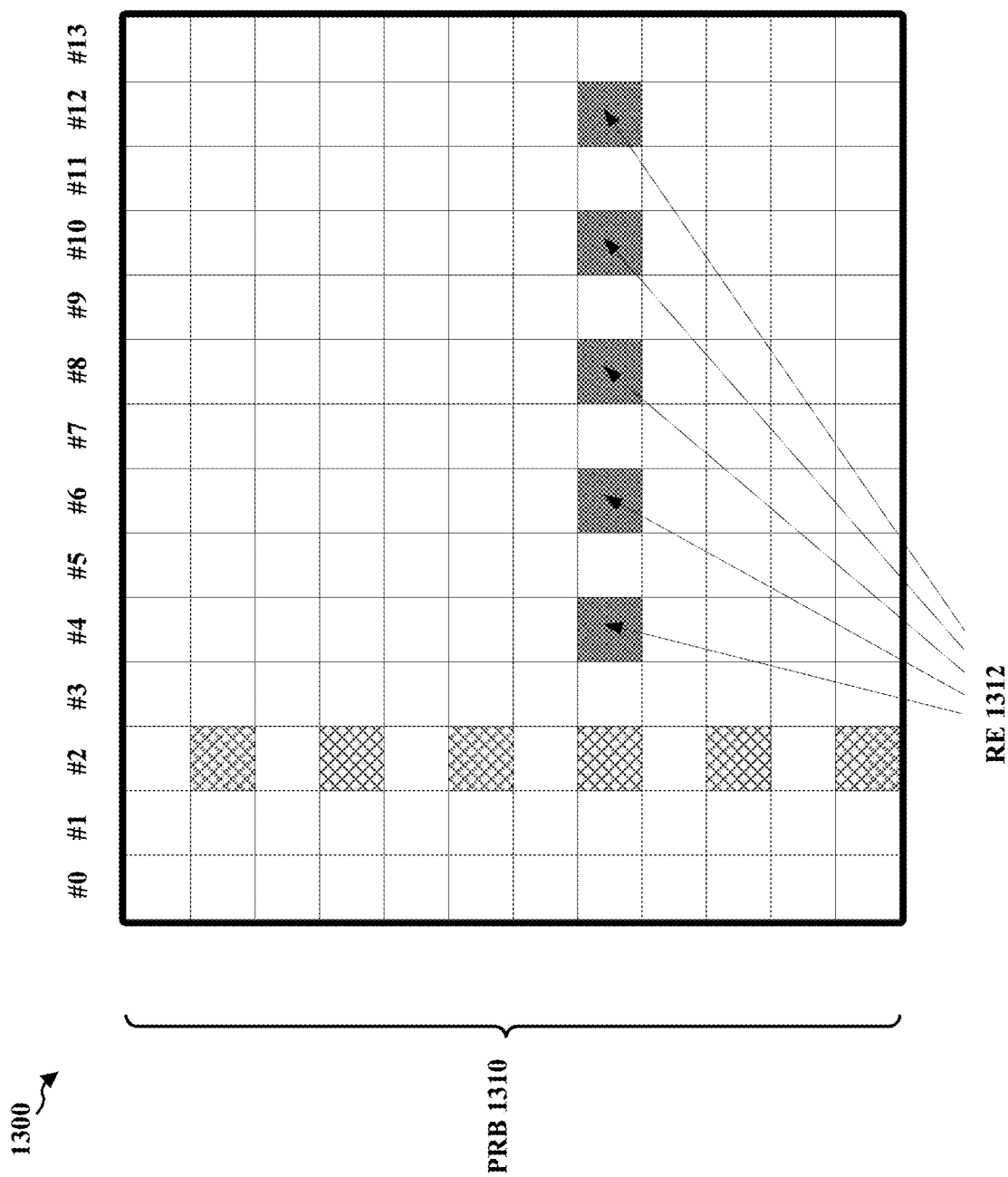
FIG. 13 is a diagram illustrating a physical resource block (PRB) transmitted by a UE in a slot.

FIG. 13 is a diagram 1300 illustrating a physical resource block (PRB) 1310 transmitted by the UE 704 in a slot. The slot contains PUSCH 1352, PUSCH DM-RS 1354 and PUSCH PT-RS 1356. In this example, REs 1312 carry PUSCH PT-RSs 1356, and the PUSCH PT-RSs 1356 are transmitted in every two symbols in the time domain.

In a first technique, CPEs are estimated at the base station 702. A respective PT-RS port at the UE 704 is assigned to each of the repeaters 706-1 . . . 706-K. Thus, the base station 702 can separately estimate a CPE for a link from the UE 704, to a particular repeater, and to the base station 702 base on the PT-RSs transmitted from the PT-RS port assigned to that particular repeater. In this example, the UE 704 sends PT-RSs from K ports in $f_2$. More specifically, the UE 704 sends PT-RSs from the first port to the repeater 706-1 in the first $TTI_2$ interval (e.g., slot 1110-0). Subsequently, the UE 704 sends PT-RSs from the i-th port to the i-th repeater in the i-th $TTI_2$ interval (e.g., slot 1110-i). In the subsequent $TTI_1$ interval (e.g., slot 1130-0), the repeaters 706-1 . . . 706-K forwards the received PT-RSs of the K ports to the base station 702. The base station therefore can, based on the PT-RS ports, distinguish PT-RSs received in the same $TTI_1$ interval (e.g., the slot 1130-0) but forwarded by different repeaters. Similar to what was described supra regarding downlink CPEs, the base station 702 can determine CPEs for a link through each repeater, respectively, based on the PT-RSs associated with that repeater. The base station 702 may inform the UE 704 the corresponding PT-RS configurations for each of the repeaters 706-1 . . . 706-K, enabling the UE 704 to transmit PT-RSs using the appropriate configurations for each repeater link. By performing this first technique, the base station 702 can mitigate the impact of CPEs on the transmissions between the UE 704 and the base station 702 through different repeaters. The system's overall performance and link quality can be improved through accurate estimation of CPEs for each repeater path.

Using the repeater 706-1 as an example, a PUSCH PT-RS 1356 is in the q-th OFDM symbol of the slot 1140 and a PUSCH DM-RS 1354 in the OFDM symbol 2, which is known to the base station 702. Using the below equation, which was described supra, $$\hat{\phi}_q = \frac{1}{N_{PTRS}} \sum_{l \in P} \arg\left(\frac{\hat{H}_{l,q}^{PTRS}}{\hat{H}_{l,2}^{DMRS}}\right).$$

The base station 702 can estimate a phase rotation $\hat{\phi}_q$ of the CPE of the q-th OFDM symbol in the slot 1140. For those OFDM symbols containing no PT-RS, the corresponding phase rotations produced by the CPE can be estimated via interpolation from the estimated phase rotation $\hat{\phi}$ in symbols containing PT-RSs. In the slot 1140, the base station 702 receives signals transmitted from each of the repeaters 706-1 . . . 706-K. The base station 702 can distinguish reference signals forwarded by different repeaters based on the DM-RS ports of the UE 704 associated with the signals. Each of the repeaters 706-1 . . . 706-K forwards to the base station 702 signals from unique DM-RS port of the UE 704.

After obtaining signals forwarded by a particular repeater in an OFDM symbol q, the base station 702 compensates CPEs for the signals on REs carrying DMRS ports accordingly, in order to extract channel response without CPEs. In this process, the base station 702 compensates for the CPEs introduced in the link between the UE 704 and the base station 702 through the specific repeater. In other words, the base station 702 can compensate for the phase rotations associated with each repeater link based on the estimated values of $\hat{\phi}_q$ obtained from the previously described equation. To perform this compensation, the base station 702 applies an inverse phase rotation $e^{-j\hat{\phi}_q}$ to the received signals for each repeater link, thereby mitigating the impact of CPEs. This process allows the base station 702 to obtain more accurate channel information, resulting in improved overall system performance and enhanced link quality. Then the base station can recover data signals transmitted by the UE based on the received signals on the second frequency, estimated channel response, and the estimated CPEs.

In a second technique, the CPEs occurring in the high-frequency transmissions on $f_2$ between the UE 704 and each repeater 706-1 ... 706-K are compensated by the respective repeaters 706-1 ... 706-K before they forward the received RF signals to the base station 702 on $f_1$. The UE 704 may utilize shared PT-RSs for all UE-to-repeater links on $f_2$ (e.g., 28 GHz in FR2). These PT-RSs may be transmitted from the same port. This allows each repeater to estimate the CPE in the q-th OFDM symbol of a corresponding slot of the multiple slots 1120-0 to 1120-3 according to the below equation described supra:

$$\hat{\phi}_q = \frac{1}{N_{PTRS}} \sum_{l \in P} \arg\left(\frac{\hat{H}_{l,q}^{PTRS}}{\hat{H}_{l,2}^{DMRS}}\right).$$

By performing this second compensation technique, each repeater 706-1 ... 706-K can individually estimate and compensate for the CPEs associated with their respective UE-to-repeater links. This process enables the repeaters to forward compensated signals to the base station 702, reducing the impact of CPEs on the overall system performance and improving the link quality between the UE 704, the repeaters, and the base station 702.

To achieve this compensation, each repeater may apply an inverse phase rotation $e^{-j\hat{\phi}_q}$ to the received signals, where $\hat{\phi}_q$ represents the estimated phase rotation of the CPE for the q-th OFDM symbol in the specific slot allocated for this repeater. Once the CPE is compensated, each repeater forwards the compensated signals to the base station 702 on $f_1$. For example, the i-th reception antenna of the repeater 1106 receives signals $\tilde{g}_{q,i}$ in the q-th OFDM symbol. An inversion phase rotation is applied to the signals to obtain compensated signals $\tilde{g}_{q,i} \cdot e^{-j\hat{\phi}_q}$. The compensated signals $\tilde{g}_{q,i} \cdot e^{-j\hat{\phi}_q}$ are then mapped to $m_{k,i}$ as described supra. Subsequently, the i-th transmission antenna of the repeater 706-1 transmits $m_{k,i}$ to the base station 702 in a $TTI_i$ interval (e.g., the slot 1130-0).

With this compensation technique, the repeaters 706-1 to 706-K are aware of the PT-RS configurations, which can be signaled by the base station 702 or be informed by the UE 704.

Upon receiving the compensated RF signals from the repeaters 706-1 ... 706-K, the base station 702 can then utilize the compensated signals to accurately process and decode the received information. As a result, this second compensation technique reduces the impact of CPEs on the overall system performance and enhances the link quality between the UE 704 and the base station 702 via the repeaters.

Figure 14:
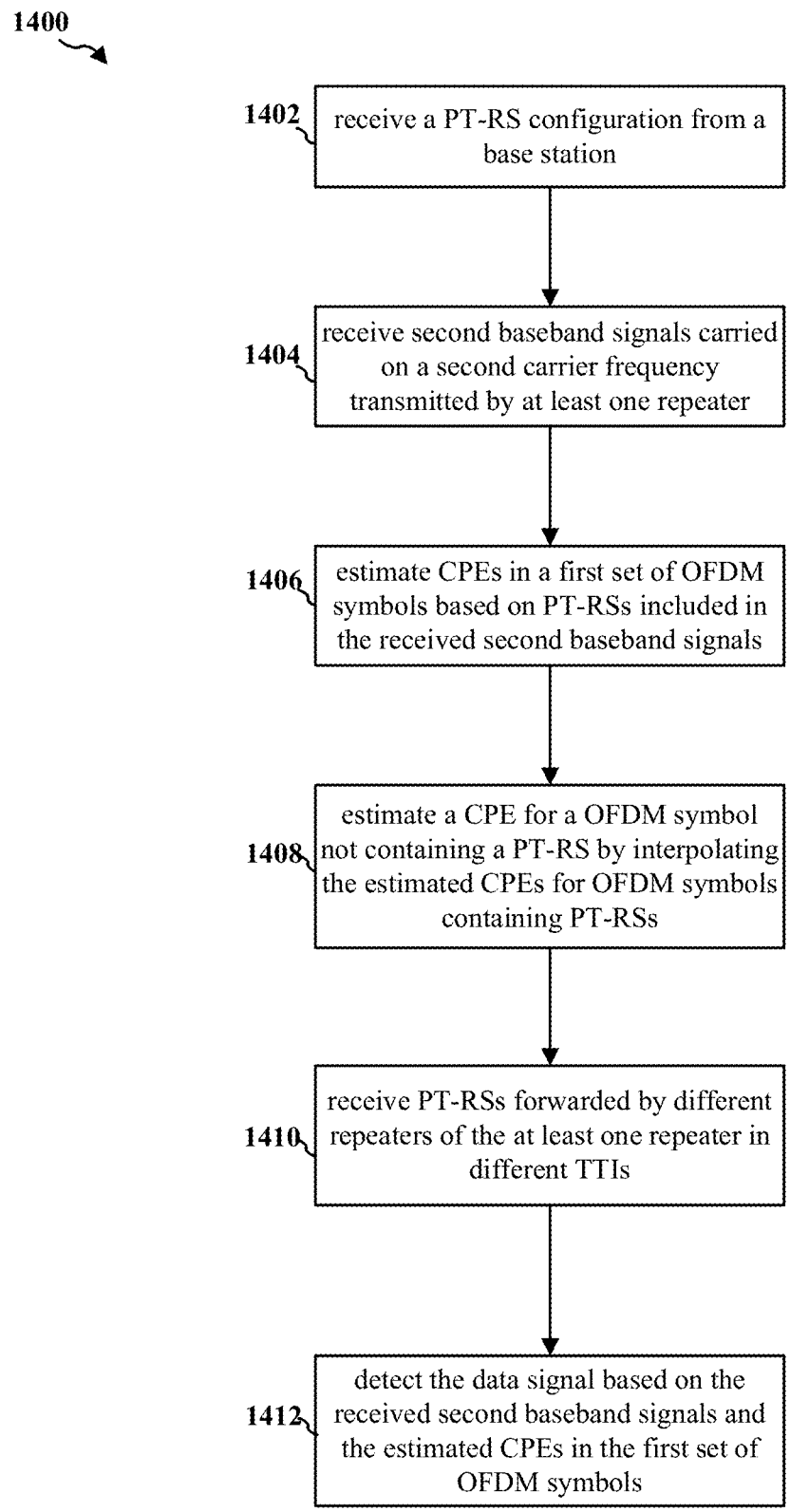
FIG. 14 is a flow chart of a method (process) for downlink CPE estimation and compensation.

FIG. 14 is a flow chart 1400 of a method (process) for downlink CPE estimation and compensation. The method may be performed by a UE. In operation 1402, the UE receives a PT-RS configuration from the base station. The PT-RS configuration includes information on time and frequency locations and values of the PT-RSs.

In operation 1404, the UE receives second baseband signals carried on a second carrier frequency ($f_2$) transmitted by at least one repeater. The second baseband signals carry a data signal transmitted from the base station and are derived from first baseband signals carried on a first carrier frequency ($f_1$) transmitted from the base station. The first carrier frequency ($f_1$) may be in a first frequency range (FR1) and the second carrier frequency ($f_2$) may be in a second frequency range (FR2).

In operation 1406, the UE estimates common phase errors (CPEs) in a first set of Orthogonal Frequency-Division Multiplexing (OFDM) symbols based on Phase Tracking Reference Signals (PT-RSs) included in the received second baseband signals. The PT-RSs are transmitted by the base station on the first carrier frequency ($f_1$) and forwarded to the UE on the second carrier frequency ($f_2$) through the at least one repeater. In certain configurations, the CPEs are estimated based on phase differences between estimated channels of PT-RS measurements in the first set of OFDM symbols and estimated channels of Demodulation Reference Signals (DM-RS) measurements in a second set of OFDM symbols for subcarriers scheduled with PT-RSs.

In operation 1408, the UE estimates a CPE for an OFDM symbol not containing a PT-RS by interpolating the estimated CPEs for OFDM symbols containing PT-RSs. Additionally, in operation 1410, the UE receives PT-RSs forwarded by different repeaters of the at least one repeater in different transmission time intervals (TTIs).

Finally, in operation 1412, the UE detects the data signal based on the received second baseband signals and the estimated CPEs in the first set of OFDM symbols. In certain configurations, the received second baseband signals are compensated for the estimated CPEs by applying an inverse phase rotation corresponding to the estimated CPEs to the received second baseband signals.

Figure 15:
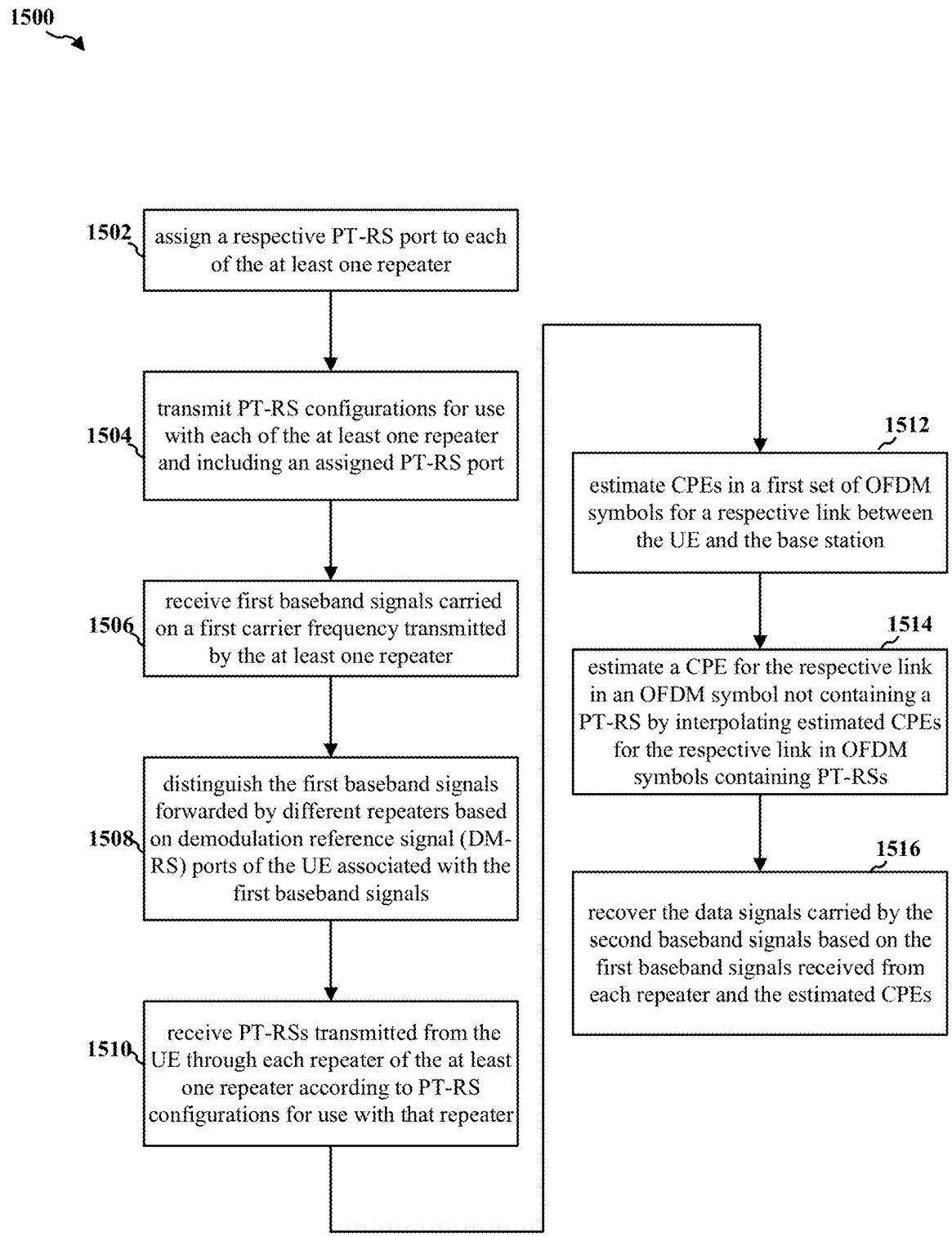
FIG. 15 is a flow chart of a method (process) for uplink CPE estimation and compensation.

FIG. 15 is a flow chart 1500 of a method (process) for uplink CPE estimation and compensation. The method may be performed by a base station. In operation 1502, the base station assigns a respective PT-RS port to each of at least one repeater. In operation 1504, the base station transmits, to the UE, PT-RS configurations for use with each of the at least one repeater and including an assigned PT-RS port.

In operation 1506, the base station receives first baseband signals carried on a first carrier frequency ($f_1$) transmitted by at least one repeater. The first baseband signals are derived from second baseband signals carried on a second carrier frequency ($f_2$) transmitted from the UE. The first carrier frequency ($f_1$) may be in a first frequency range (FR1), and the second carrier frequency ($f_2$) may be in a second frequency range (FR2).

In operation 1508, the base station distinguishes the first baseband signals forwarded by different repeaters based on demodulation reference signal (DM-RS) ports of the UE associated with the first baseband signals. Each of the at least one repeater forwards signals from a unique DM-RS port of the UE. During operation 1510, the base station receives PT-RSs transmitted from the UE through each repeater of the at least one repeater according to PT-RS configurations for use with that repeater.

In operation 1512, the base station estimates common phase errors (CPEs) in a first set of Orthogonal Frequency-Division Multiplexing (OFDM) symbols for a respective link between the UE and the base station through each repeater of the at least one repeater based on phase tracking reference signals (PT-RSs) associated with that repeater included in the received first baseband signals. The PT-RSs are transmitted by the UE on the second carrier frequency ($f_2$) and forwarded to the base station on the first carrier frequency ($f_1$) through that repeater. In certain configurations, the CPEs for a respective link through each repeater are estimated based on phase differences between estimated channels through the respective link based on PT-RS measurements in the first set of OFDM symbols and estimated channels through the respective link based on Demodulation Reference Signals (DM-RS) measurements in a second set of OFDM symbols for subcarriers scheduled with PT-RSs.

In operation 1514, the base station estimates a CPE for the respective link in an OFDM symbol not containing a PT-RS by interpolating estimated CPEs for the respective link in OFDM symbols containing PT-RSs. Subsequently, in operation 1516, the base station recovers data signal transmitted by the UE based on the first baseband signals received from each repeater and the estimated CPEs associated with a respective link between the UE and the base station through that repeater.

Figure 16:
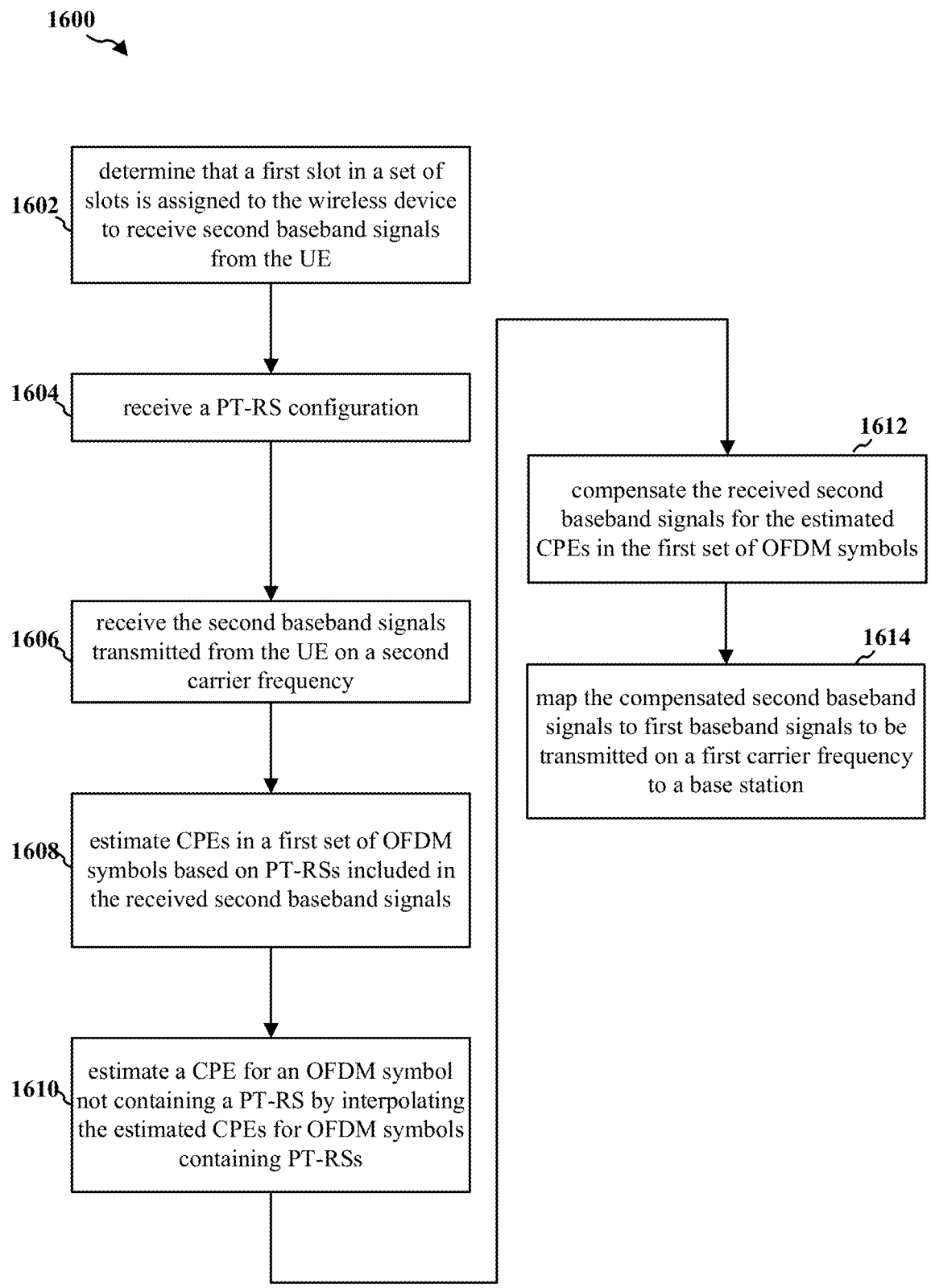
FIG. 16 is a flow chart of another method (process) for uplink CPE estimation and compensation.

FIG. 16 is a flow chart 1600 of another method (process) for uplink CPE estimation and compensation. The method may be performed by a wireless device (e.g., the repeater 706-1). In operation 1602, the wireless device determines that a first slot in a set of slots is assigned to the wireless device to receive second baseband signals from the UE, while the other slots of the set of slots are assigned to other wireless devices to receive second baseband signals from the UE.

In operation 1604, the wireless device receives a PT-RS configuration from either the base station or the UE. The PT-RS configuration includes information on the time and frequency locations and values of the PT-RSs included in the second baseband signals. In operation 1606, the wireless device receives the second baseband signals transmitted from the UE on a second carrier frequency ($f_2$).

In operation 1608, the wireless device estimates common phase errors (CPEs) in a first set of Orthogonal Frequency-Division Multiplexing (OFDM) symbols based on Phase Tracking Reference Signals (PT-RSs) included in the received second baseband signals. The CPEs may be estimated based on phase differences between estimated channels based on PT-RS measurements in the first set of OFDM symbols and estimated channels based on Demodulation Reference Signals (DM-RS) measurements in a second set of OFDM symbols for subcarriers scheduled with PT-RSs. This is an optional feature that can enhance the accuracy of the CPE estimation process.

In operation 1610, the wireless device estimates a CPE for an OFDM symbol not containing a PT-RS by interpolating the estimated CPEs for OFDM symbols containing PT-RSs. In operation 1612, the wireless device compensates the received second baseband signals for the estimated CPEs in the first set of OFDM symbols. This compensation involves applying an inverse phase rotation corresponding to the estimated CPEs to the received second baseband signals. In operation 1614, the wireless device maps the compensated second baseband signals to first baseband signals to be transmitted on a first carrier frequency ($f_1$) to a base station.

Figure 17:
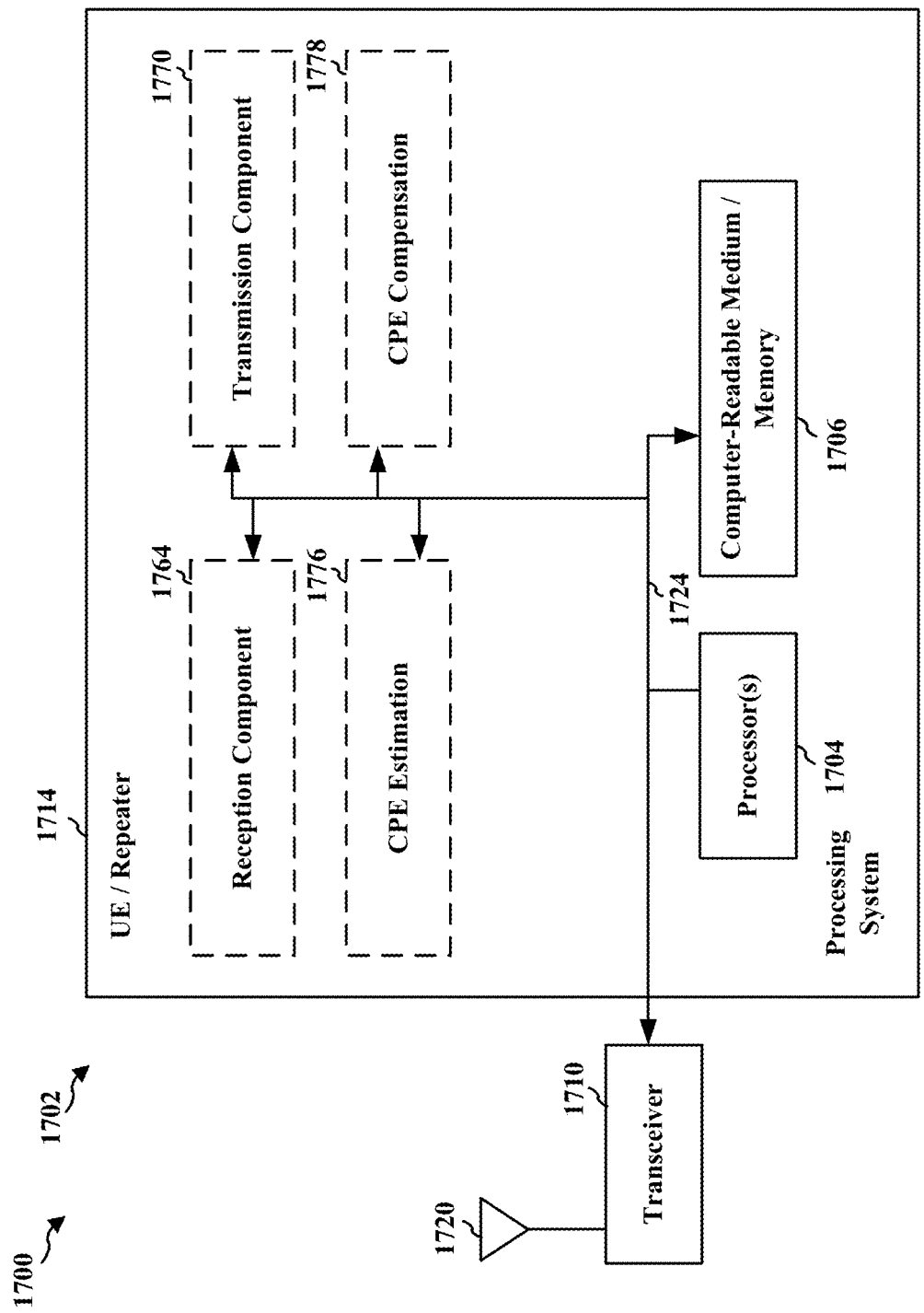
FIG. 17 is a diagram illustrating an example of a hardware implementation for an apparatus employing a processing system.

FIG. 17 is a diagram 1700 illustrating an example of a hardware implementation for an apparatus 1702 employing a processing system 1714. In one configuration, the apparatus 1702 may be a UE (e.g., the UE 704). In another configuration, the apparatus 1702 may be a repeater (e.g., the repeater 706-1) The processing system 1714 may be implemented with a bus architecture, represented generally by a bus 1724. The bus 1724 may include any number of interconnecting buses and bridges depending on the specific application of the processing system 1714 and the overall design constraints. The bus 1724 links together various circuits including one or more processors and/or hardware components, represented by one or more processors 1704, a reception component 1764, a transmission component 1770, a CPE estimation component 1776, a CPE compensation component 1778, and a computer-readable medium/memory 1706. The bus 1724 may also link various other circuits such as timing sources, peripherals, voltage regulators, and power management circuits, etc.

The processing system 1714 may be coupled to a transceiver 1710, which may be one or more of the transceivers 254. The transceiver 1710 is coupled to one or more antennas 1720, which may be the communication antennas 252.

The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1764. In addition, the transceiver 1710 receives information from the processing system 1714, specifically the transmission component 1770, and based on the received information, generates a signal to be applied to the one or more antennas 1720.

The processing system 1714 includes one or more processors 1704 coupled to a computer-readable medium/memory 1706. The one or more processors 1704 are responsible for general processing, including the execution of software stored on the computer-readable medium/memory 1706. The software, when executed by the one or more processors 1704, causes the processing system 1714 to perform the various functions described supra for any particular apparatus. The computer-readable medium/memory 1706 may also be used for storing data that is manipulated by the one or more processors 1704 when executing software. The processing system 1714 further includes at least one of the reception component 1764, the transmission component 1770, the CPE estimation component 1776, and the CPE compensation component 1778. The components may be software components running in the one or more processors 1704, resident/stored in the computer readable medium/memory 1706, one or more hardware components coupled to the one or more processors 1704, or some combination thereof. The processing system 1714 may be a component of the UE 250 and may include the memory 260 and/or at least one of the TX processor 268, the RX processor 256, and the communication processor 259.

In the configuration as a UE, the apparatus 1702 for wireless communication includes means for performing each operation/procedure of the UE referring to FIG. 14. In the configuration as a repeater, the apparatus 1702 for wireless communication includes means for performing each operation/procedure of the wireless device referring to FIG. 16. The aforementioned means may be one or more of the aforementioned components of the apparatus 1702 and/ or the processing system 1714 of the apparatus 1702 configured to perform the functions recited by the aforementioned means.

As described supra, the processing system 1714 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

Figure 18:
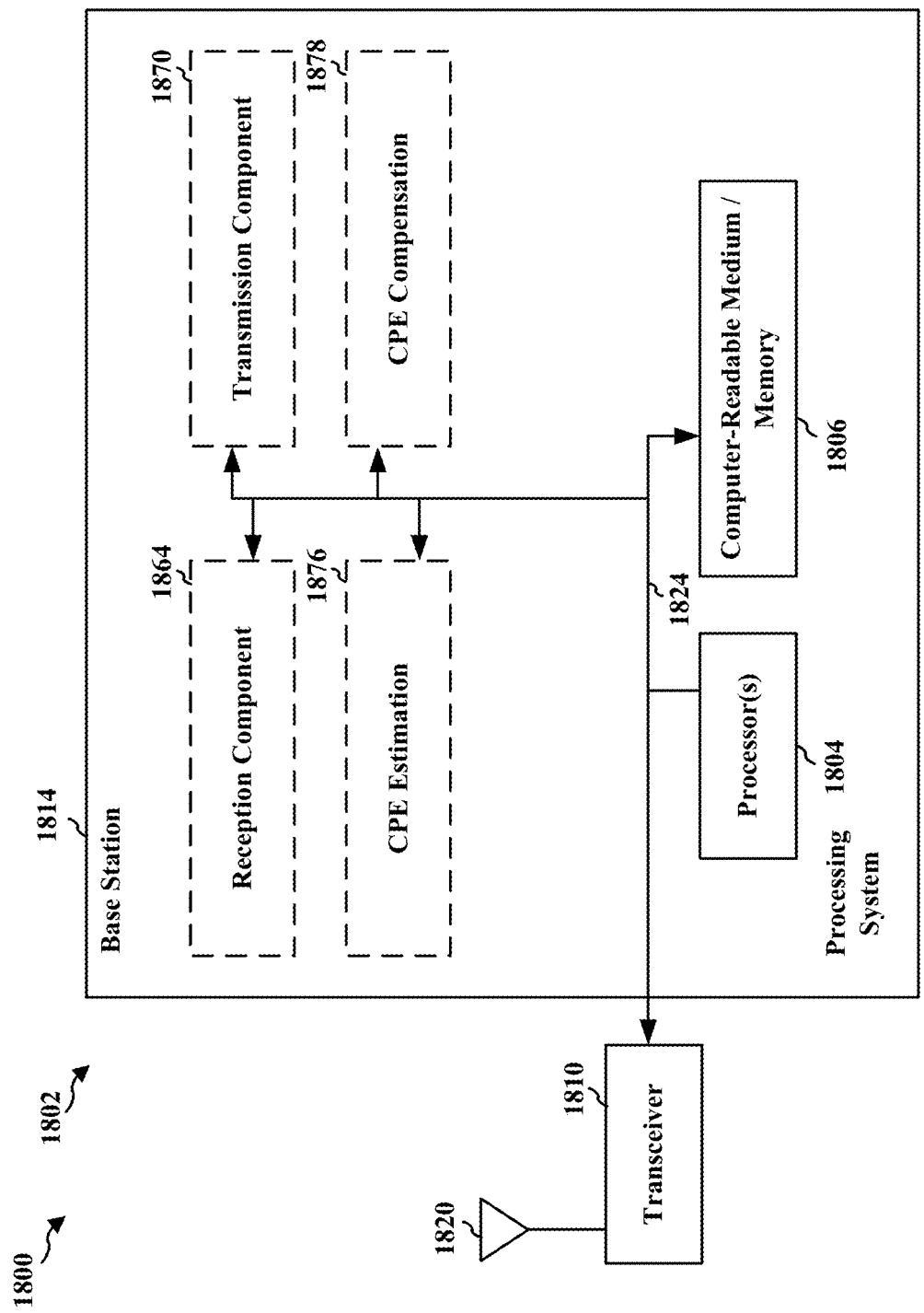
FIG. 18 is a diagram illustrating an example of a hardware implementation for another apparatus employing a processing system.

FIG. 18 is a diagram 1800 illustrating an example of a hardware implementation for an apparatus 1802 employing a processing system 1814. The apparatus 1802 may be a base station (e.g., the base station 702). The processing system 1814 may be implemented with a bus architecture, represented generally by a bus 1824. The bus 1824 may include any number of interconnecting buses and bridges depending on the specific application of the processing system 1814 and the overall design constraints. The bus 1824 links together various circuits including one or more processors and/or hardware components, represented by one or more processors 1804, a reception component 1864, a transmission component 1870, a CPE estimation component 1876, and a CPE compensation component 1878, and a computer-readable medium/memory 1806. The bus 1824 may also link various other circuits such as timing sources, peripherals, voltage regulators, and power management circuits, etc.

The processing system 1814 may be coupled to a transceiver 1810, which may be one or more of the transceivers 254. The transceiver 1810 is coupled to one or more antennas 1820, which may be the communication antennas 220.

The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1864. In addition, the transceiver 1810 receives information from the processing system 1814, specifically the transmission component 1870, and based on the received information, generates a signal to be applied to the one or more antennas 1820.

The processing system 1814 includes one or more processors 1804 coupled to a computer-readable medium/memory 1806. The one or more processors 1804 are responsible for general processing, including the execution of software stored on the computer-readable medium/memory 1806. The software, when executed by the one or more processors 1804, causes the processing system 1814 to perform the various functions described supra for any particular apparatus. The computer-readable medium/memory 1806 may also be used for storing data that is manipulated by the one or more processors 1804 when executing software. The processing system 1814 further includes at least one of the reception component 1864, the transmission component 1870, the CPE compensation component 1878, and the CPE estimation component 1876. The components may be software components running in the one or more processors 1804, resident/stored in the computer readable medium/memory 1806, one or more hardware components coupled to the one or more processors 1804, or some combination thereof. The processing system 1814 may be a component of the base station 210 and may include the memory 276 and/or at least one of the TX processor 216, the RX processor 270, and the controller/processor 275.

In one configuration, the apparatus 1802 for wireless communication includes means for performing each of the operations of FIG. 15. The aforementioned means may be one or more of the aforementioned components of the apparatus 1802 and/or the processing system 1814 of the apparatus 1802 configured to perform the functions recited by the aforementioned means.

As described supra, the processing system 1814 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a User Equipment (UE), comprising:
  receiving second baseband signals carried on a second carrier frequency ($f_2$) transmitted by at least one repeater, wherein the second baseband signals carry data signals transmitted from a base station and are derived from first baseband signals carried on a first carrier frequency ($f_1$) transmitted from the base station;

estimating common phase errors (CPEs) in a first set of Orthogonal Frequency-Division Multiplexing (OFDM) symbols based on Phase Tracking Reference Signals (PT-RSs) included in the received second baseband signals, wherein the PT-RSs are transmitted by the base station on the first carrier frequency ($f_1$) and forwarded to the UE on the second carrier frequency ($f_2$) through the at least one repeater; and detecting the data signal based on the received second baseband signals and the estimated CPEs in the first set of OFDM symbols.

2. The method of claim 1, wherein the CPEs are estimated based on phase differences between estimated channels based on PT-RS measurements in the first set of OFDM symbols and estimated channels based on Demodulation Reference Signals (DM-RS) measurements in a second set of OFDM symbols for subcarriers scheduled with PT-RSs.

3. The method of claim 1, wherein the received second baseband signals are compensated for the estimated CPEs by applying an inverse phase rotation corresponding to the estimated CPEs to the received second baseband signals.

4. The method of claim 1, further comprising estimating a CPE for a OFDM symbol not containing a PT-RS by interpolating the estimated CPEs for OFDM symbols containing PT-RSs.

5. The method of claim 1, further comprising:
receiving PT-RSs forwarded by different repeaters of the at least one repeater in different transmission time intervals (TTIs).

6. The method of claim 1, further comprising:
receiving a PT-RS configuration from the base station, wherein the PT-RS configuration includes information on time and frequency locations and values of the PT-RSs.

7. The method of claim 1, wherein the first carrier frequency ($f_1$) is in a first frequency range (FR1) and the second carrier frequency ($f_2$) is in a second frequency range (FR2).

8. A method of wireless communication of a base station, comprising:
receiving, at the base station, first baseband signals carried on a first carrier frequency ($f_1$) transmitted by at least one repeater, wherein the first baseband signals are derived from second baseband signals carrying data signals on a second carrier frequency ($f_2$) transmitted from a user equipment (UE);
estimating, at the base station, common phase errors (CPEs) in a first set of Orthogonal Frequency-Division Multiplexing (OFDM) symbols for a respective link between the UE and the base station through each repeater of the at least one repeater based on phase tracking reference signals (PT-RSs) associated with that repeater included in the received first baseband signals, wherein the PT-RSs are transmitted by the UE on the second carrier frequency ($f_2$) and forwarded to the base station on the first carrier frequency ($f_1$) through that repeater; and
recovering, at the base station, the data signals carried by the second baseband signals based on the first baseband signals received from each repeater and the estimated CPEs associated with a respective link between the UE and the base station through that repeater.

9. The method of claim 8, further comprising:
assigning, at the base station, a respective PT-RS port to each of the at least one repeater;
transmitting, from the base station to the UE, PT-RS configurations for use with each of the at least one repeater and including an assigned PT-RS port; and
receiving, at the base station, PT-RSs transmitted from the UE through each repeater of the at least one repeater according to PT-RS configurations for use with that repeater.

10. The method of claim 8, wherein the CPEs for a respective link through each repeater are estimated based on phase differences between estimated channels through the respective link based on PT-RS measurements in the first set of OFDM symbols and estimated channels through the respective link based on Demodulation Reference Signals (DM-RS) measurements in a second set of OFDM symbols for subcarriers scheduled with PT-RSs.

11. The method of claim 8, further comprising:
distinguishing, at the base station, the first baseband signals forwarded by different repeaters based on demodulation reference signal (DM-RS) ports of the UE associated with the first baseband signals, wherein each of the at least one repeater forwards signals from a unique DM-RS port of the UE.

12. The method of claim 8, wherein the first baseband signals received from each repeater are compensated for the estimated CPEs associated with the respective link through that repeater by applying an inverse phase rotation corresponding to the estimated CPEs associated with the respective link to the first baseband signals received from that repeater.

13. The method of claim 8, further comprising estimating a CPE for the respective link in an OFDM symbol not containing a PT-RS by interpolating estimated CPEs for the respective link in OFDM symbols containing PT-RSs.

14. The method of claim 8, wherein the first carrier frequency ($f_1$) is in a first frequency range (FR1) and the second carrier frequency ($f_2$) is in a second frequency range (FR2).

15. A method of wireless communication of a wireless device, comprising:
receiving, at the wireless device, second baseband signals transmitted from a user equipment (UE) on a second carrier frequency ($f_2$);
estimating common phase errors (CPEs) in a first set of Orthogonal Frequency-Division Multiplexing (OFDM) symbols based on Phase Tracking Reference Signals (PT-RSs) included in the received second baseband signals;
compensating the received second baseband signals for the estimated CPEs in the first set of OFDM symbols; and
mapping the compensated second baseband signals to first baseband signals to be transmitted on a first carrier frequency ($f_1$) to a base station.

16. The method of claim 15, wherein the CPEs are estimated based on phase differences between estimated channels based on PT-RS measurements in the first set of OFDM symbols and estimated channels based on Demodulation Reference Signals (DM-RS) measurements in a second set of OFDM symbols for subcarriers scheduled with PT-RSs.

17. The method of claim 15, wherein compensating the received second baseband signals comprises applying an inverse phase rotation corresponding to the estimated CPEs to the received second baseband signals.

18. The method of claim 15, further comprising estimating a CPE for an OFDM symbol not containing a PT-RS by interpolating the estimated CPEs for OFDM symbols containing PT-RSs.

19. The method of claim 15, further comprising:
    determining that a first slot in a set of slots is assigned to the wireless device to receive the second baseband signals from the UE, while the other slots of the set of slots are assigned to other wireless devices to receive second baseband signals from the UE.

20. The method of claim 15, further comprising:
    receiving, at the wireless device, a PT-RS configuration from the base station or the UE, wherein the PT-RS configuration includes information on time and frequency locations and values of the PT-RSs included in the second baseband signals.

* * * * *